US009483151B2

(12) United States Patent
Solven et al.

(10) Patent No.: US 9,483,151 B2
(45) Date of Patent: Nov. 1, 2016

(54) SINGLE LAYER MULTI-TOUCH CAPACITIVE IMAGING SENSOR

(71) Applicant: SYNAPTICS INCORPORATED, San Jose, CA (US)

(72) Inventors: Derek Solven, San Jose, CA (US); Tyler Moore, Redwood City, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 14/750,668

(22) Filed: Jun. 25, 2015

(65) Prior Publication Data
US 2015/0317012 A1 Nov. 5, 2015

Related U.S. Application Data

(63) Continuation of application No. 14/067,801, filed on Oct. 30, 2013, now Pat. No. 9,081,457.

(51) Int. Cl.
*G06F 3/00* (2006.01)
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04104* (2013.01)

(58) Field of Classification Search
CPC ........ G06F 3/045; G06F 17/00; G06F 3/044; G06F 2203/0338; G09G 1/00; H04M 1/00; H04M 1/74
See application file for complete search history.

(56) References Cited

U.S. PATENT DOCUMENTS

| 4,087,625 | A | 5/1978 | Dym et al. |
| 4,233,522 | A | 11/1980 | Grummer et al. |
| 4,237,421 | A | 12/1980 | Waldron |
| 4,264,903 | A | 4/1981 | Bigelow |
| 4,293,987 | A | 10/1981 | Gottbreht et al. |
| 4,484,026 | A | 11/1984 | Thornburg |
| 4,492,958 | A | 1/1985 | Minami |

(Continued)

FOREIGN PATENT DOCUMENTS

| CN | 2436978 Y | 6/2001 |
| CN | 1490713 A | 4/2004 |

(Continued)

OTHER PUBLICATIONS

Quantum Research Group. "Qmatrix Technology White Paper", 2006. 4 Pages.

(Continued)

*Primary Examiner* — Michael Faragalla
(74) *Attorney, Agent, or Firm* — Patterson + Sheridan, LLP

(57) ABSTRACT

Embodiments of the invention generally provide an input device having a reduced system complexity and low production cost. As the size of input devices, such as touch pads and other similar devices increase, the need for an input device that is able to maintain or even improve the touch sensing accuracy without greatly increasing the manufacturing cost becomes increasingly important. Embodiments of the invention may provide an input device that includes an array of capacitive sensing pixels that each include a unique pair of sensor electrodes, wherein at least one of the electrodes in a first pixel is also in communication with another sensor electrode in at least one other pixel, which is not in the same row or column with the first pixel.

10 Claims, 11 Drawing Sheets

(56) References Cited

U.S. PATENT DOCUMENTS

| | | |
|---|---|---|
| 4,550,221 A | 10/1985 | Mabusth |
| 4,659,874 A | 4/1987 | Landmeier |
| 4,667,259 A | 5/1987 | Uchida et al. |
| 4,677,259 A | 6/1987 | Abe |
| 4,705,919 A | 11/1987 | Dhawan |
| 4,771,138 A | 9/1988 | Dhawan |
| 4,878,013 A | 10/1989 | Andermo |
| 4,954,823 A | 9/1990 | Binstead |
| 4,999,462 A | 3/1991 | Purcell |
| 5,053,715 A | 10/1991 | Andermo |
| 5,062,916 A | 11/1991 | Aufderheide et al. |
| 5,239,307 A | 8/1993 | Andermo |
| 5,341,233 A | 8/1994 | Tomoike et al. |
| 5,459,463 A | 10/1995 | Gruaz et al. |
| 5,463,388 A | 10/1995 | Boie et al. |
| 5,650,597 A | 7/1997 | Redmayne |
| 5,657,012 A | 8/1997 | Tait |
| 5,777,596 A | 7/1998 | Herbert |
| 5,841,078 A | 11/1998 | Miller et al. |
| 5,869,790 A | 2/1999 | Shigetaka et al. |
| 6,188,391 B1 | 2/2001 | Seely et al. |
| 6,222,522 B1 | 4/2001 | Mathews et al. |
| 6,256,022 B1 | 7/2001 | Manaresi et al. |
| 6,281,888 B1 | 8/2001 | Hoffman et al. |
| 6,288,707 B1 | 9/2001 | Philipp |
| 6,297,811 B1 | 10/2001 | Kent et al. |
| 6,307,751 B1 | 10/2001 | Bodony et al. |
| 6,320,394 B1 | 11/2001 | Tartagni |
| 6,362,633 B1 | 3/2002 | Tartagni |
| 6,380,930 B1 | 4/2002 | Van Ruymbeke |
| 6,452,514 B1 | 9/2002 | Philipp |
| 6,459,044 B2 | 10/2002 | Watanabe et al. |
| 6,486,862 B1 | 11/2002 | Jacobsen et al. |
| 6,512,381 B2 | 1/2003 | Kramer |
| 6,535,200 B2 | 3/2003 | Philipp |
| 6,583,632 B2 | 6/2003 | Von Basse et al. |
| 6,653,736 B2 | 11/2003 | Kishimoto et al. |
| 6,731,120 B2 | 5/2004 | Tartagni |
| 6,771,327 B2 | 8/2004 | Sekiguchi |
| 6,825,833 B2 | 11/2004 | Mulligan et al. |
| 6,879,930 B2 | 4/2005 | Sinclair et al. |
| 6,910,634 B1 | 6/2005 | Inose et al. |
| 6,937,031 B2 | 8/2005 | Yoshioka et al. |
| 6,998,855 B2 | 2/2006 | Tartagni |
| 7,129,935 B2 | 10/2006 | Mackey |
| 7,158,125 B2 | 1/2007 | Sinclair et al. |
| 7,218,314 B2 | 5/2007 | Itoh |
| 7,306,144 B2 | 12/2007 | Moore |
| 7,327,352 B2 | 2/2008 | Keefer et al. |
| 7,339,579 B2 | 3/2008 | Richter et al. |
| 7,348,967 B2 | 3/2008 | Zadesky et al. |
| 7,382,139 B2 | 6/2008 | Mackey |
| 7,388,571 B2 | 6/2008 | Lowles et al. |
| 7,423,219 B2 | 9/2008 | Kawaguchi et al. |
| 7,423,635 B2 | 9/2008 | Taylor et al. |
| 7,439,962 B2 | 10/2008 | Reynolds et al. |
| 7,455,529 B2 | 11/2008 | Fujii et al. |
| 7,522,230 B2 | 4/2009 | Lee |
| 7,548,073 B2 | 6/2009 | Mackey et al. |
| 7,554,531 B2 | 6/2009 | Baker et al. |
| 7,589,713 B2 | 9/2009 | Sato |
| 7,663,607 B2 | 2/2010 | Hotelling et al. |
| 7,724,243 B2 | 5/2010 | Geaghan |
| 7,768,273 B1 | 8/2010 | Kalnitsky et al. |
| 7,786,981 B2 | 8/2010 | Proctor |
| 7,808,255 B2 | 10/2010 | Hristov et al. |
| 7,812,825 B2 | 10/2010 | Sinclair et al. |
| 7,821,274 B2 | 10/2010 | Philipp et al. |
| 7,821,502 B2 | 10/2010 | Hristov |
| 7,864,160 B2 | 1/2011 | Geaghan et al. |
| 7,876,309 B2 | 1/2011 | XiaoPing |
| 7,973,771 B2 | 7/2011 | Geaghan |
| 7,977,953 B2 | 7/2011 | Lee |
| 7,986,152 B2 | 7/2011 | Philipp et al. |
| 8,040,326 B2 | 10/2011 | Hotelling et al. |
| 8,059,015 B2 | 11/2011 | Hua et al. |
| 8,125,463 B2 | 2/2012 | Hotelling et al. |
| 8,243,027 B2 | 8/2012 | Hotelling et al. |
| 8,259,078 B2 | 9/2012 | Hotelling et al. |
| 8,278,571 B2 | 10/2012 | Orsley |
| 8,319,747 B2 | 11/2012 | Hotelling et al. |
| 2002/0077313 A1 | 6/2002 | Clayman |
| 2003/0052867 A1 | 3/2003 | Shigetaka et al. |
| 2003/0103043 A1 | 6/2003 | Mulligan et al. |
| 2003/0234771 A1 | 12/2003 | Mulligan et al. |
| 2004/0062012 A1 | 4/2004 | Murohara |
| 2004/0077313 A1 | 4/2004 | Oba et al. |
| 2004/0125087 A1 | 7/2004 | Taylor et al. |
| 2004/0222974 A1 | 11/2004 | Hong et al. |
| 2004/0239650 A1 | 12/2004 | Mackey |
| 2004/0252109 A1 | 12/2004 | Trent et al. |
| 2005/0030048 A1 | 2/2005 | Bolender et al. |
| 2006/0038754 A1 | 2/2006 | Kim |
| 2006/0097991 A1 | 5/2006 | Hotelling et al. |
| 2006/0114240 A1 | 6/2006 | Lin |
| 2006/0114241 A1 | 6/2006 | Lin |
| 2006/0232600 A1 | 10/2006 | Kimura et al. |
| 2007/0008299 A1 | 1/2007 | Hristov |
| 2007/0222762 A1 | 9/2007 | Van Delden et al. |
| 2007/0229466 A1 | 10/2007 | Peng et al. |
| 2007/0229468 A1 | 10/2007 | Peng et al. |
| 2007/0229469 A1 | 10/2007 | Seguine |
| 2007/0229470 A1 | 10/2007 | Snyder et al. |
| 2007/0242054 A1 | 10/2007 | Chang et al. |
| 2007/0257894 A1 | 11/2007 | Philipp |
| 2007/0262962 A1 | 11/2007 | XiaoPing et al. |
| 2007/0262963 A1 | 11/2007 | Xiao-Ping et al. |
| 2007/0268265 A1 | 11/2007 | XiaoPing |
| 2007/0273659 A1 | 11/2007 | XiaoPing et al. |
| 2007/0273660 A1 | 11/2007 | XiaoPing |
| 2007/0279395 A1 | 12/2007 | Philipp et al. |
| 2007/0291009 A1 | 12/2007 | Wright et al. |
| 2008/0006453 A1 | 1/2008 | Hotelling |
| 2008/0007534 A1 | 1/2008 | Peng et al. |
| 2008/0062140 A1 | 3/2008 | Hotelling et al. |
| 2008/0074398 A1 | 3/2008 | Wright |
| 2008/0111795 A1 | 5/2008 | Bollinger |
| 2008/0117182 A1 | 5/2008 | Um et al. |
| 2008/0150906 A1 | 6/2008 | Grivna |
| 2008/0158172 A1 | 7/2008 | Hotelling et al. |
| 2008/0158181 A1 | 7/2008 | Hamblin et al. |
| 2008/0164076 A1 | 7/2008 | Orsley |
| 2008/0218488 A1 | 9/2008 | Yang et al. |
| 2008/0245582 A1 | 10/2008 | Bytheway |
| 2008/0259044 A1 | 10/2008 | Utsunomiya et al. |
| 2008/0264699 A1 | 10/2008 | Chang et al. |
| 2008/0265914 A1 | 10/2008 | Matsushima |
| 2008/0297176 A1 | 12/2008 | Douglas |
| 2008/0308323 A1 | 12/2008 | Huang et al. |
| 2008/0309635 A1 | 12/2008 | Matsuo |
| 2009/0002337 A1 | 1/2009 | Chang |
| 2009/0002338 A1* | 1/2009 | Kinoshita ............... G06F 3/045 345/174 |
| 2009/0009551 A1 | 1/2009 | Takahashi |
| 2009/0040191 A1 | 2/2009 | Tong et al. |
| 2009/0046077 A1 | 2/2009 | Tanaka et al. |
| 2009/0091551 A1* | 4/2009 | Hotelling ............... G06F 3/0416 345/174 |
| 2009/0096757 A1 | 4/2009 | Hotelling et al. |
| 2009/0107737 A1 | 4/2009 | Reynolds et al. |
| 2009/0128518 A1 | 5/2009 | Kinoshita et al. |
| 2009/0135151 A1 | 5/2009 | Sun |
| 2009/0153509 A1 | 6/2009 | Jiang et al. |
| 2009/0160682 A1 | 6/2009 | Bolender et al. |
| 2009/0185100 A1 | 7/2009 | Matsuhira et al. |
| 2009/0201267 A1 | 8/2009 | Akimoto et al. |
| 2009/0207154 A1 | 8/2009 | Chino |
| 2009/0213082 A1 | 8/2009 | Ku |
| 2009/0213534 A1 | 8/2009 | Sakai |
| 2009/0236151 A1 | 9/2009 | Yeh et al. |
| 2009/0262096 A1 | 10/2009 | Teramoto |
| 2009/0267916 A1 | 10/2009 | Hotelling |
| 2009/0273571 A1 | 11/2009 | Bowens |
| 2009/0273573 A1 | 11/2009 | Hotelling |

(56) References Cited

U.S. PATENT DOCUMENTS

| | | |
|---|---|---|
| 2009/0277695 A1 | 11/2009 | Liu et al. |
| 2009/0283340 A1 | 11/2009 | Liu et al. |
| 2009/0303203 A1 | 12/2009 | Yilmaz et al. |
| 2009/0309850 A1 | 12/2009 | Yang |
| 2009/0314621 A1 | 12/2009 | Hotelling |
| 2009/0324621 A1 | 12/2009 | Senter et al. |
| 2010/0001966 A1 | 1/2010 | Lii et al. |
| 2010/0006347 A1 | 1/2010 | Yang |
| 2010/0013745 A1 | 1/2010 | Kim et al. |
| 2010/0013800 A1 | 1/2010 | Elias et al. |
| 2010/0044122 A1 | 2/2010 | Sleeman et al. |
| 2010/0090979 A1 | 4/2010 | Bae |
| 2010/0134422 A1 | 6/2010 | Borras |
| 2010/0140359 A1 | 6/2010 | Hamm et al. |
| 2010/0147600 A1 | 6/2010 | Orsley |
| 2010/0149108 A1 | 6/2010 | Hotelling et al. |
| 2010/0156839 A1 | 6/2010 | Ellis |
| 2010/0163394 A1 | 7/2010 | Tang et al. |
| 2010/0182273 A1 | 7/2010 | Noguchi et al. |
| 2010/0188359 A1 | 7/2010 | Lee |
| 2010/0214247 A1 | 8/2010 | Tang et al. |
| 2010/0220075 A1 | 9/2010 | Kuo et al. |
| 2010/0258360 A1 | 10/2010 | Yilmaz |
| 2010/0265210 A1 | 10/2010 | Nakanishi et al. |
| 2010/0271330 A1 | 10/2010 | Philipp |
| 2010/0277433 A1 | 11/2010 | Lee et al. |
| 2010/0289770 A1 | 11/2010 | Lee et al. |
| 2010/0291973 A1 | 11/2010 | Nakahara et al. |
| 2010/0302201 A1 | 12/2010 | Ritter et al. |
| 2010/0321043 A1 | 12/2010 | Philipp et al. |
| 2010/0321326 A1 | 12/2010 | Grunthaner et al. |
| 2011/0018841 A1 | 1/2011 | Hristov |
| 2011/0022351 A1 | 1/2011 | Philipp et al. |
| 2011/0025639 A1 | 2/2011 | Trend et al. |
| 2011/0048812 A1 | 3/2011 | Yilmaz |
| 2011/0048813 A1 | 3/2011 | Yilmaz |
| 2011/0057887 A1 | 3/2011 | Lin et al. |
| 2011/0062969 A1 | 3/2011 | Hargreaves et al. |
| 2011/0062971 A1 | 3/2011 | Badaye |
| 2011/0063251 A1 | 3/2011 | Geaghan et al. |
| 2011/0080357 A1 | 4/2011 | Park et al. |
| 2011/0090159 A1 | 4/2011 | Kurashima |
| 2011/0096016 A1 | 4/2011 | Yilmaz |
| 2011/0109579 A1 | 5/2011 | Wang et al. |
| 2011/0109590 A1 | 5/2011 | Park |
| 2011/0141051 A1 | 6/2011 | Ryu |
| 2011/0169770 A1 | 7/2011 | Mishina et al. |
| 2011/0187666 A1 | 8/2011 | Min |
| 2011/0267300 A1 | 11/2011 | Serban et al. |
| 2011/0273391 A1 | 11/2011 | Bae |
| 2012/0044171 A1 | 2/2012 | Lee et al. |
| 2012/0056820 A1 | 3/2012 | Corbridge |
| 2012/0313901 A1 | 12/2012 | Monson |

FOREIGN PATENT DOCUMENTS

| | | |
|---|---|---|
| EP | 0810540 A2 | 12/1997 |
| EP | 0919945 A2 | 6/1999 |
| EP | 0977159 A1 | 2/2000 |
| JP | 2002-215330 A | 8/2002 |
| JP | 2002-268768 A | 9/2002 |
| JP | 2002268786 A | 9/2002 |
| JP | 2011002947 A | 1/2011 |
| JP | 2011002948 A | 1/2011 |
| JP | 2011002949 A | 1/2011 |
| JP | 2011002950 A | 1/2011 |
| JP | 2011004076 A | 1/2011 |
| JP | 2011100379 A | 5/2011 |
| KR | 10110118065 | 1/2012 |
| WO | 86/06551 A1 | 11/1986 |
| WO | 0057344 A1 | 9/2000 |
| WO | 2010117946 A2 | 10/2010 |
| WO | 20100136932 A1 | 12/2010 |

OTHER PUBLICATIONS

Lubart, et al. "One Layer Optically Transparent Keyboard for Input Display", IP.com. Mar. 1, 1979. 3 Pages.

Gary L. Barrett et al. "Projected Capacitive Touch Screens", iTouchInternational. 9 pages.

Quantum Research Application Note An-KD01. "Qmatrix Panel Design Guidelines", Oct. 10, 2002. 4 Pages.

Calvin Wang et al. "Single Side All-Point-Addressable Clear Glass Substrate Sensor Design", IP.com. Apr. 2, 2009. 3 Pages.

Tsz-Kin Ho et al. "32.3: Simple Single-Layer Multi-Touch Projected Capacitive Touch Panel", SID 09 Digest.

Johannes Schoning et al. "Multi-Touch Surfaces: A Technical Guide", Technical Report TUM-I0833. 2008.

Shawn Day. "Low Cost Touch Sensor on the Underside of a Casing", IP.com. Oct. 14, 2004.

Ken Gilleo. "The Circuit Centennial", 16 Pages.

Ken Gilleo, "The Definitive History of the Printed Circuit", 1999 PC Fab.

Hal Philipp. "Charge Transfer Sensing", vol. 19, No. 2. 1999. pp. 96-105.

Paul Leopardi, "A Partition of the Unit Sphere into Regions of Equal Area and Small Diameter", 2005.

Olivier Bau, "TeslaTouch: Electrovibration for Touch Surfaces", 2010.

Colin Holland. "SID: Single Layer Technology Boosts Capacitive Touchscreens", www.eetimes.com/General. 2011.

"Novel Single Layer Touchscreen Based on Indium", 2011.

"Mesh Patterns for Capacitive Touch or Proximity Sensors", IP.com. May 14, 2010. 3pages.

"IDT Claims World's First True Single-Layer Multi-Touch Projected Capacitive Touch Screen Technology", EE Times Europe. Dec. 8, 2010.

Tracy V. Wilson et al. "How the iPhone Works", HowStuffWorks "Multi-touch Systems". 2011.

Sunkook Kim et al. "A Highly Sensitive Capacitive Touch Sensor Integrated on a Thin-Film-Encapsulated Active-Matrix OLED for Ultrathin Displays", IEEE Transactions on Electron Devices, vol. 58, No. 10, Oct. 2011.

Mike Williams, "Dream Screens from Graphene", Technology Developed at Rice could Revolutionize Touch-Screen Displays. Aug. 2011.

ASIC Packaging Guidebook, Toshiba Corporation. (2000). 35 pages.

Fujitsu Microelectronics Limited. "IC Package." (2002). 10 pages.

International Search Report, PCT/US2013/021314 dated Jun. 25, 2013.

* cited by examiner

SINGLE LAYER MULTI-TOUCH CAPACITIVE IMAGING SENSOR

CROSS REFERENCE TO RELATED APPLICATION

This application is a continuation of U.S. patent application Ser. No. 14/067,801, filed Oct. 30, 2013, which is incorporated by reference in its entirety.

BACKGROUND OF THE INVENTION

1. Field of the Invention

Embodiments of the present invention generally relate to a system and method for sensing a position of an input object over a sensing region of a proximity sensing device.

2. Description of the Related Art

Input devices including proximity sensor devices, also commonly called touchpads or touch sensor devices, are widely used in a variety of electronic systems. A proximity sensor device typically includes a sensing region in which the proximity sensor device determines the presence, location and/or motion of one or more input objects, such as a finger. Proximity sensor devices may be used to provide interfaces for an electronic system. For example, proximity sensor devices are often used as input devices for larger computing systems, such as opaque touchpads integrated in, or peripheral to notebook or desktop computers. Proximity sensor devices are also often used in smaller computing systems, such as touch screens integrated in cellular phones. Proximity sensor devices are typically used in combination with other supporting components, such as display or input devices found in the electronic or computing system.

In some configurations, the proximity sensor devices are coupled to these supporting components to provide a desired combined function or to provide a desirable complete device package. Many commercially available proximity sensor devices utilize one or more electrical techniques to determine the presence, location and/or motion of an input object, such as a capacitive or a resistive sensing technique. Typically, a capacitive sensing type of proximity sensor device utilizes an array of sensor electrodes and traces to detect the presence, location and/or motion of an input object. A trace is an electronic component that connects an electrode region within a sensor electrode to the controlling electronics found in the proximity sensor device. Due to the often large number of sensor electrodes used to sense the presence and position of an input object with desirable accuracy, and also the need to connect each of these sensor electrodes to the various signal generation and data collection components in the electronic or computing system, the cost associated with forming these interconnections, the reliability of the system and the overall size of the proximity sensor device are often undesirably large and complex. It is a common goal in the consumer and industrial electronics industries to reduce the cost and/or size of the electrical components in the formed electronic device. One will note that the cost and size limitations placed on the proximity sensor device are often created by the number of traces that are required, the number of required connection points, the connection component's complexity (e.g., number of pins on a connector) and the complexity of the flexible components used to interconnect the sensor electrodes to the control system.

During the operation of a capacitive sensing device the presence of an input object over the sensing region of the proximity sensor device, which contains the sensor electrodes and their respective traces, the input object will interfere with the signal provided by the driven electrodes (i.e., transmitter electrodes) and also their respective traces (i.e., transmitter traces). Unfortunately, the coupling between the transmitter electrodes and the receiver electrodes is also affected by the interaction of the signal transmitted from the transmitter traces to the receiver electrodes. Thus, the interaction of an input object and the signal transmitted from the traces will cause an unwanted parasitic response. For example, a finger that is coupled to a particular sensor electrode is also likely to be coupled to traces that are connected to other sensor electrodes that are not positioned such that they will significantly interact with the input object. The controlling electronics in the proximity sensor device incorrectly interprets the coupling between the input object and the traces as a response at the other sensor electrodes that are not positioned to directly couple with the input object. This incorrect interpretation of a response created by the input object and the local traces is known as a parasitic response. The parasitic response causes the controlling electronics to incorrectly determine that one or more phantom input objects are interacting with the proximity sensor device, and affect the controlling electronics ability to determine the actual location of the actual input object. Moreover, the greater the length of the traces used to interconnect the sensor electrodes to the computer system, the more susceptible the proximity sensor device is to interference, such as electromagnetic interference (EMI), and the more susceptible the proximity sensor device is to a parasitic response. The parasitic response and interference provided by these supporting components will adversely affect the reliability and accuracy of the data collected by the proximity sensing device.

Therefore, there is a need for an apparatus and method of forming a proximity sensing device that is reliable, provides consistent and accurate position sensing results, is inexpensive to produce and can be integrated within a desirably sized electronic system.

SUMMARY OF THE INVENTION

Embodiment of the invention provide an input device that includes an array of capacitive sensing pixels that each include a unique pair of sensor electrodes, wherein at least one of the electrodes in a first capacitive sensing pixel is also in communication with another sensor electrode in at least one other capacitive sensing pixel. The at least one other capacitive sensing pixel also need not be in the same row or column with the first capacitive sensing pixel. Advantageously, techniques of the present invention enable an input device to determine more accurately and more reliably a location of an input object covering a capacitive sensing region of the input device.

Embodiment of the invention may further provide a capacitive image sensor, comprising a first array of first sensor electrodes disposed on a surface of a substrate, wherein each of the first sensor electrodes comprise a first electrode region, and each of the first electrode regions are aligned in a first direction that is parallel to the surface, a first array of second sensor electrodes disposed on the surface of the substrate, wherein each of the second sensor electrodes comprise a second electrode region, and each of the first electrode regions in the first array of first sensor electrodes are positioned to directly capacitively couple to at least a portion of a second sensor electrode in the first array of second sensor electrodes. The capacitive image sensor may further include a second array of first sensor electrodes disposed on the surface of the substrate, wherein each of the first electrode regions of the first sensor electrodes in the second array are aligned in the first direction, and a second array of second sensor electrodes disposed on the surface of the substrate, wherein each of the first electrode regions in the second array of first sensor electrodes are positioned to directly capacitively couple to at least a portion of a second sensor electrode in the second array of second sensor electrodes. The second array of first sensor electrodes in the capacitive image sensor can be positioned a distance in a second direction from the first array of first sensor electrodes, where the second direction is not parallel to the first direction. The first array of first sensor electrodes and the second array of first sensor electrodes in the capacitive image sensor can be disposed on the surface of the substrate between the first array of second sensor electrodes and the second array of second sensor electrodes, and at least one second sensor electrode in the first array of second sensor electrodes is electrically coupled to at least one second sensor electrode in the second array of second sensor electrodes.

Embodiment of the invention may further provide a capacitive image sensor that comprises a first, second and third set of sensor electrode arrays. The first set of set of sensor electrode arrays may comprise a first array of first sensor electrodes disposed on a surface of a substrate, wherein each of the first sensor electrodes comprise a first electrode region, and each of the first electrode regions are aligned in a first direction that is parallel to the surface, a first array of second sensor electrodes disposed on the surface of the substrate, wherein each of the second sensor electrodes comprise a second electrode region, and each of the first electrode regions in the first array of first sensor electrodes are positioned to directly capacitively couple to at least a portion of a second sensor electrode in the first array of second sensor electrodes. The second set of set of sensor electrode arrays may comprise a second set of sensor electrode arrays comprising a second array of first sensor electrodes disposed on the surface of the substrate, wherein each of the first electrode regions of the first sensor electrodes in the second array are aligned in the first direction, and a second array of second sensor electrodes disposed on the surface of the substrate, wherein each of the first electrode regions in the second array of first sensor electrodes are positioned to directly capacitively couple to at least a portion of a second sensor electrode in the second array of second sensor electrodes. The third set of set of sensor electrode arrays may comprise a third set of sensor electrode arrays comprising a third array of first sensor electrodes disposed on the surface of the substrate, wherein each of the first electrode regions of the first sensor electrodes in the third array are aligned in the first direction, and a third array of second sensor electrodes disposed on the surface of the substrate, wherein each of the first electrode regions in the third array of first sensor electrodes are positioned to directly capacitively couple to at least a portion of a second sensor electrode in the third array of second sensor electrodes. The second and third arrays of first sensor electrodes in the capacitive image sensor can each be positioned a distance in a second direction from the first array of first sensor electrodes, and the second direction is not parallel to the first direction. The capacitive image sensor may also be configured so that the third set of sensor electrode arrays is disposed between the first set of sensor electrode arrays and the second set of sensor electrode arrays, and wherein at least one second sensor electrode in the first array of second sensor electrodes is electrically coupled to at least one second sensor electrode in the second array of second sensor electrodes.

Embodiment of the invention may further provide a touch screen, comprising a display, a plurality of sensor electrodes disposed on a substrate of the display, the plurality of sensor electrodes comprising a first array of first sensor electrodes disposed on a surface of a substrate, wherein each of the first sensor electrodes comprise a first electrode region and a trace that is coupled to the first electrode region, and each of the first electrode regions are aligned along a first direction that is parallel to the surface. The touch screen may also include a first array of second sensor electrodes disposed on the surface of the substrate, wherein each of the second sensor electrodes comprise a second electrode region and a trace that is coupled to the second electrode region, and each of the first electrode regions in the first array of first sensor electrodes are positioned to directly capacitively couple to at least a portion of a second sensor electrode in the first array of second sensor electrodes. The touch screen may also include a second array of first sensor electrodes disposed on the surface of the substrate, wherein each of the first electrode regions of the first sensor electrodes in the second array are aligned along the first direction, and a second array of second sensor electrodes disposed on the surface of the substrate. Each of the first electrode regions in the second array of first sensor electrodes are positioned to directly capacitively couple to at least a portion of a second sensor electrode in the second array of second sensor electrodes, and the second array of first sensor electrodes are positioned a distance in a second direction from the first array of first sensor electrodes, and the second direction is not parallel to the first direction, The first array of first sensor electrodes and the second array of first sensor electrodes are disposed on the surface of the substrate between the first array of second sensor electrodes and the second array of second sensor electrodes, and at least one second sensor electrode in the first array of second sensor electrodes is electrically coupled to at least one second sensor electrode in the second array of second sensor electrodes, and a sensor processor communicatively coupled to the traces of the first and second sensor electrodes, and configured to receive resulting signals received by one or more of the second sensor electrodes when a first sensor electrode is driven for capacitive sensing.

Embodiment of the invention may further provide a touch screen, comprising a display, a plurality of sensor electrodes disposed on a substrate of the display, the plurality of sensor electrodes comprising a first, second and third set of sensor electrode arrays. The first set of sensor electrodes may comprise a first array of first sensor electrodes disposed on a surface of a substrate, wherein each of the first sensor electrodes comprise a first electrode region and a trace that is coupled to the first electrode region, and each of the first electrode regions are aligned in a first direction that is parallel to the surface, and a first array of second sensor electrodes disposed on the surface of the substrate, wherein each of the second sensor electrodes in the first array comprise a second electrode region and a trace that is coupled to the second electrode region, and each of the first electrode regions in the first array of first sensor electrodes are positioned to directly capacitively couple to at least a portion of a second sensor electrode in the first array of second sensor electrodes. The second set of sensor electrodes may comprise a second set of sensor electrode arrays comprising a second array of first sensor electrodes disposed on the surface of the substrate, wherein each of the first electrode regions of the first sensor electrodes in the second array are aligned in the first direction; and a second array of second sensor electrodes disposed on the surface of the substrate, wherein each of the first electrode regions in the second array of first sensor electrodes are positioned to directly capacitively couple to at least a portion of a second sensor electrode in the second array of second sensor electrodes. The third set of sensor electrodes may comprise a third set of sensor electrode arrays comprising a third array of first sensor electrodes disposed on the surface of the substrate, wherein each of the first electrode regions of the first sensor electrodes in the third array are aligned in the first direction; and a third array of second sensor electrodes disposed on the surface of the substrate, wherein each of the first electrode regions in the third array of first sensor electrodes are positioned to directly capacitively couple to at least a portion of a second sensor electrode in the third array of second sensor electrodes. The second and third arrays of first sensor electrodes in the touch screen may each be positioned a distance in a second direction from the first array of first sensor electrodes, where the second direction is not parallel to the first direction. The third set of sensor electrode arrays in the touch screen can be disposed between the first set of sensor electrode arrays and the second set of sensor electrode arrays. The touch screen may also further comprise at least one second sensor electrode in the first array of second sensor electrodes is electrically coupled to at least one second sensor electrode in the second array of second sensor electrodes, and a sensor processor communicatively coupled to the traces of the first and second sensor electrodes, and configured to receive resulting signals received by one or more of the second sensor electrodes when a first sensor electrode is driven for capacitive sensing.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
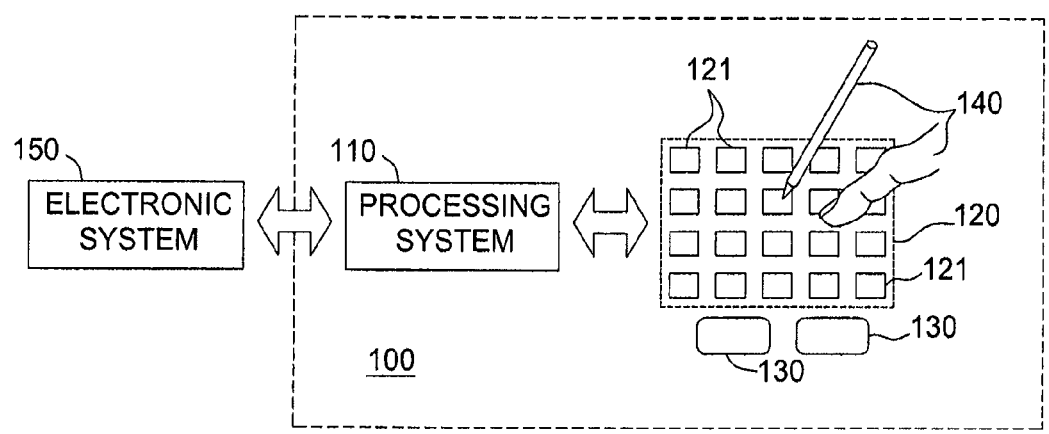
FIG. 1 is a schematic block diagram of an exemplary input device, in accordance with embodiments of the invention.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

General Overview

Embodiments of the invention generally provide an input device having a reduced system complexity and low production cost. As the size of input devices, such as touch pads and other similar devices increase, the need for an input device that is able to maintain or even improve the touch sensing accuracy without greatly increasing the manufacturing cost becomes increasingly important. Embodiments of the invention may provide an input device that has an electrode configuration which has a similar sensing electrode size, electrode pitch and electrode density (e.g., electrodes per unit area) distributed over a larger sensing region of a larger input device without greatly increasing the cost and complexity associated with the increased number of sensor electrodes and supporting signal processing components needed to compensate for the increased size of the input device. Accordingly, the embodiments of the invention can be used to reduce the cost of existing input device designs and minimize the costs required to produce the next generation devices.

Embodiments of the invention may provide an input device that includes an array of capacitive sensing pixels that each include a unique pair of sensor electrodes, wherein at least one of the electrodes in a first capacitive sensing pixel is also in communication with another sensor electrode in at least one other capacitive sensing pixel, which is not in the same row or column with the first pixel. Advantageously, techniques of the present invention also enable an input device to determine more accurately and more reliably a location of an input object covering a capacitive sensing region of the input device. One or more of the embodiments discussed herein may also include an input device that has a plurality of sensing elements that are interconnected in desired way to reliably and accurately acquire positional information of an input object. The acquired positional information may be used to control the system's operation mode, as well as graphical user interface (GUI) actions, such as cursor movement, selection, menu navigation, and other functions. In one embodiment, one or more capacitive sensing techniques and/or novel sensor electrode array configurations are used to reduce or minimize the number of traces and/or sensor electrodes required to sense the positional information of an input object within the sensing region of the input device.

System Overview

FIG. 1 is a block diagram of an exemplary input device 100, in accordance with embodiments of the invention. In FIG. 1, the input device 100 is a proximity sensor device (e.g., "touchpad," "touch screen," "touch sensor device") configured to sense inputs provided by one or more input objects 140 positioned in a sensing region 120. Example input objects include fingers and styli, as shown in FIG. 1. In some embodiments of the invention, the input device 100 may be configured to provide input to an electronic system 150, which is sometimes referred to herein as the "host." As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional examples of electronic systems include composite input devices, such as physical keyboards that include input device 100 and separate joysticks or key switches. Further examples of electronic systems 150 include peripherals, such as data input devices (e.g., remote controls and mice) and data output devices (e.g., display screens and printers). Other examples include remote terminals, kiosks, video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). Additionally, the electronic system could be a host or a slave to the input device.

The input device 100 can be implemented as a physical part of the electronic system 150, or can be physically separate from the electronic system. As appropriate, the input device 100 may communicate with parts of the electronic system 150 using any one or more of the following: buses, networks, and other wired or wireless interconnections. Examples include I²C, SPI, PS/2, Universal Serial Bus (USB), Bluetooth, RF, and IRDA.

Sensing region 120 encompasses any space above, around, in and/or near the input device 100 in which the input device 100 is able to detect user input by one or more input objects 140. The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 generally comprises one or more sensing elements 121 for detecting user input. As several non-limiting examples, the one or more sensing elements 121 in the input device 100 may use capacitive, elastive, resistive, inductive, magnetic acoustic, ultrasonic, and/or optical techniques to detect the position or motion of the input object(s) 140. Some implementations are configured to provide sensing images that span one, two, three, or higher dimensional spaces.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. In some embodiments, the processing system 110 also comprises electronically-readable instructions, such as firmware code, software code, and/or the like. In some embodiments, components composing the processing system 110 are located together, such as near sensing element(s) 121 of the input device 100. In other embodiments, components of processing system 110 are physically separate with one or more components close to sensing elements 121 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the input device 100. Each module may comprise circuitry that is a part of the processing system 110, firmware, software, or a combination thereof. In various embodiments, different combinations of modules may be used. In one example, modules include hardware operation modules for operating hardware such as sensing elements and display screens, data processing modules for processing data, such as sensor signals, and positional information, and reporting modules for reporting information. In another example, modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. In one example, as noted above, actions may include changing operation modes, as well as GUI actions, such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system process information received from the processing system 110 is used to act on user input, such as to facilitate a full range of actions, including mode changing actions and GUI actions. For example, in some embodiments, the processing system 110 operates the sensing element(s) 121 of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensing elements 121. As another example, the processing system 110 may perform filtering or other signal conditioning. As yet another example, the processing system 110 may subtract or otherwise account for a baseline set of data (e.g., baseline image), such that the information reflects a difference between the acquired electrical signals (e.g., sensing image) and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen of a display device (not shown). For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device may share physical elements. Some embodiments of the input device 100 include at least part of the display device. For example, some embodiments may utilize some of the same electrical components for displaying and sensing. In some examples, the display screen of the display device may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

In many embodiments, the positional information of the input object 140 relative to the sensing region 120 is monitored or sensed by use of one or more sensing elements 121 (FIG. 1) that are positioned to detect its "positional information." In general, the sensing elements 121 may comprise one or more sensing elements or components that are used to detect the presence of an input object. As discussed above, the one or more sensing elements 121 of the input device 100 may use capacitive, elastive, resistive, inductive, magnetic acoustic, ultrasonic, and/or optical techniques to sense the positional information of an input object. While the information presented below primarily discuses the operation of an input device 100, which uses capacitive sensing techniques to monitor or determine the positional information of an input object 140 this configuration is not intended to be limiting as to the scope of the invention described herein, since other sensing techniques may be used.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In one embodiment of the input device 100, the sensing element 121 is a capacitive sensing element that is used to sense the positional information of the input object(s). In some capacitive implementations of the input device 100, voltage or current is applied to the sensing elements to create an electric field between an electrode and ground. Nearby input objects 140 cause changes in the electric field, and produce detectable changes in capacitive coupling that may be detected as changes in voltage, current, or the like. Some capacitive implementations utilize arrays or other regular or irregular patterns of capacitive sensing elements to create electric fields. In some capacitive implementations, portions of separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between one or more sensing elements, or one or more sensor electrodes, and an input object. In various embodiments, an at least partially grounded input object positioned near the sensor electrodes alters the electric field near the sensor electrodes, thus changing the measured capacitive coupling of the sensor electrodes to ground. In one implementation, an absolute capacitance sensing method operates by modulating sensor electrodes with respect to a reference voltage (e.g., system ground), and by detecting the capacitive coupling between the sensor electrodes and the at least partially grounded input object(s).

Some capacitive implementations utilize "mutual capacitance" (or "transcapacitance") sensing methods based on changes in the capacitive coupling between two or more sensing elements (e.g., sensor electrodes). In various embodiments, an input object near the sensor electrodes alters the electric field created between the sensor electrodes, thus changing the measured capacitive coupling. In one implementation, a transcapacitive sensing method operates by detecting the capacitive coupling between one or more transmitter sensor electrodes (also "transmitter electrodes," "transmitting electrodes" or "transmitters") and one or more receiver sensor electrodes (also "receiver electrodes" or "receiving electrodes"). Transmitter sensor electrodes may be modulated relative to a reference voltage (e.g., system ground) to transmit transmitter signals. Receiver sensor electrodes may be held substantially constant relative to the reference voltage to facilitate receipt of "resulting signals." A "resulting signal" may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive. In some implementations user input from an actively modulated device (e.g. an active pen) may act as a transmitter such that each of the sensor electrodes act as a receiver to determine the position of the actively modulated device.

Most conventional multi-touch sensing sensor devices, in which the location of more than one finger or other input can be accurately determined, comprise a matrix of transmitter sensor electrodes and receiver sensor electrodes. Conventionally, during operation, capacitive images are formed by measuring the capacitance formed between each transmitter and receiver sensor electrode (referred to as "transcapacitance" or "mutual capacitance"), forming a matrix or grid of capacitive detecting elements across the sensing region 120. The presence of an input object (such as a finger or other object) at or near an intersection between transmitter and receiver sensor electrodes changes the measured "transcapacitance". These changes are localized to the location of object, where each transcapacitive measurement is a pixel of a "capacitive image" and multiple transcapacitive measurements can be utilized to form a capacitive image of the object.

Herein sensor design and sensing scheme embodiments are described that allow the creation of 2-D capacitance images using a single sensing layer in which all of the transmitting and receiving sensor electrodes are disposed in a single common layer with one another without the use of jumpers within the sensor area. The electronics to drive the sensor are located in a processing system, such as processing system 110 described herein. These described embodiments also facilitate contact sensing, proximity sensing, and position sensing. These described embodiments also facilitate "multi-touch" sensing, such as two finger rotation gestures and two finger pinch gestures, but with a less expensive sensor compared to a sensor that utilizes sensor electrodes in multiple layers. The reduced number of layers used to form the input device described herein versus other conventional position sensing devices also equates to fewer production steps, which in itself will reduce the production cost of the device. The reduction in the layers of the input device also decreases interference or obscuration of an image or display that is viewed through the sensor, thus lending itself to improved optical quality of the formed input device when it is integrated with a display device. Additional electrodes involved in sensing the shape of the electric fields of the transmitters and receivers, such as floating electrodes or shielding electrodes, may be included in the device and may be placed on other substrates or layers. The electrodes may be part of a display (share a substrate) and may even share functionality with the display (used for both display and sensing functionality). For example electrodes may be patterned in the Color filter of an LCD (Liquid Crystal Display) or on the sealing layer of an OLED (Organic Light Emitting Diode) display. Alternately, sensing electrodes within the display or on TFT (Thin Film Transistor) layer of an active matrix display may also be used as gate or source drivers. Such electrodes may be patterned (e.g. spaced or oriented at an angle relative to the pixels) such that they minimize any visual artifacts. Furthermore, they may use hiding layers (e.g. Black Mask between pixels) to hide at least some portion of one or more conductive electrodes.

Figure 2A:
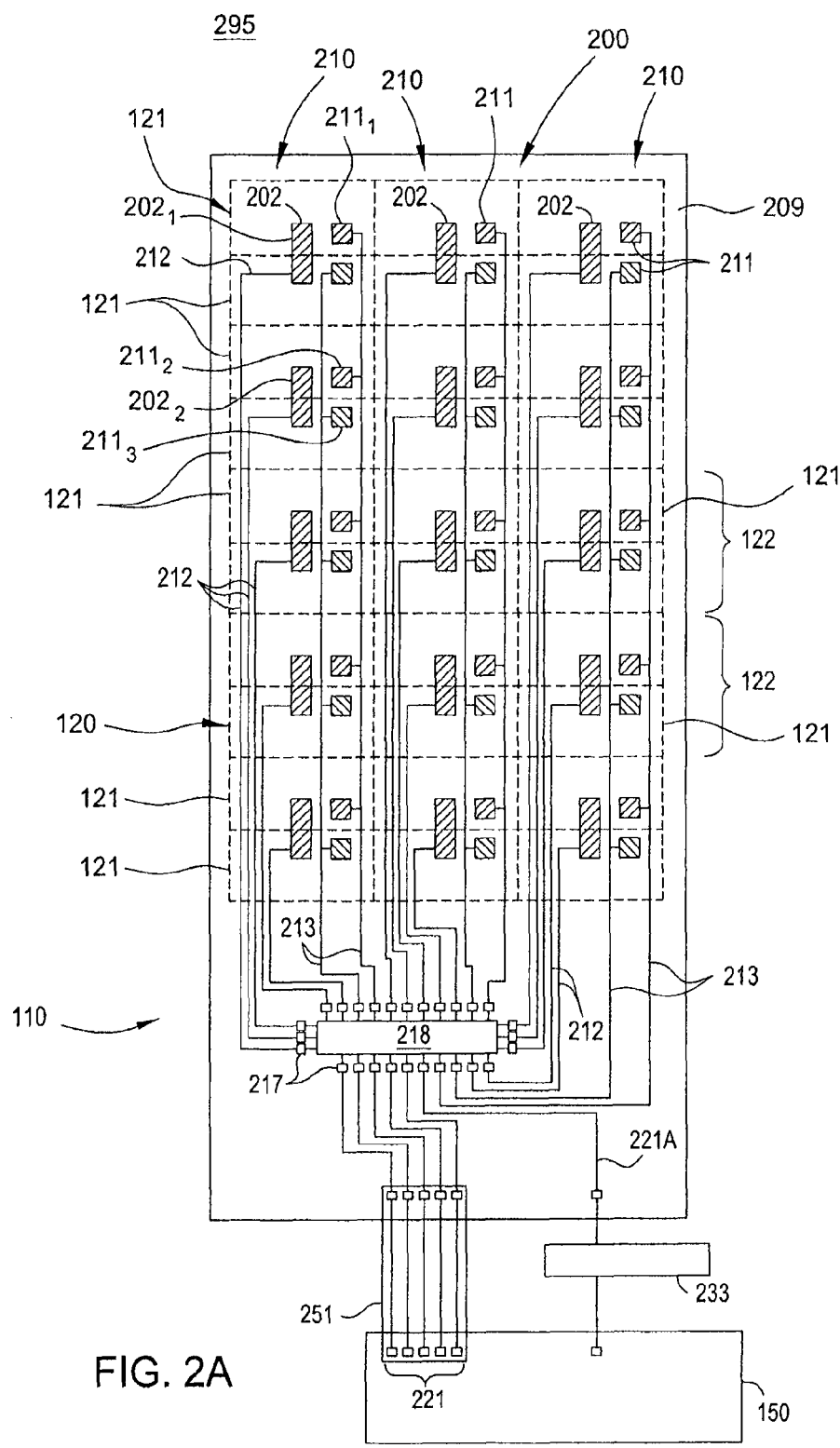
FIG. 2A is a schematic diagram illustrating an input device, according to one or more of the embodiments described herein.

FIG. 2A is a schematic top view of a portion of an input device 295 that illustrates a portion of a sensor electrode pattern that may be used to sense the positional information of an input object within the sensing region 120 using a transcapacitive sensing method. One will note that the input device 295 may be formed as part of a larger input device 100, which is discussed above. In general, the sensor electrode pattern disclosed herein comprises a sensor array collection 200 that includes a plurality of sets of sensor electrode arrays 210 that include a plurality of arrays of sensor electrodes that include a plurality of sensor electrodes, such as sensor electrodes 202 and 211, that are arranged and interconnected in a desirable manner to reduce or minimize the number of traces and/or sensor electrodes required to sense the positional information of an input object within the sensing region 120 of the input device 295. For clarity of illustration and description, while FIG. 2A illustrates a pattern of simple rectangles used to represent the sensor electrodes, this configuration is not meant to be limiting and in other embodiments, various other sensor electrode shapes may be used as discussed further herein. In other some embodiments, sensing elements 121 comprise two or more sensor electrodes, for example, sensor electrodes 202 and 211 that may be similar or different in size and/or shape. In general, a sensor electrode includes an electrode region, or portion of the sensor electrode that is intended to capacitively couple to another sensor electrode, and a trace. In one example the electrode region has a polygonal shape, such as electrode regions 203 or electrode region 204 illustrated in FIG. 2C. A trace, such as trace 212 or trace 213 in FIG. 2A, is used to connect the electrode region to other electrode regions or other the electronic components in the input device 295. In one example, as shown, these sensor electrodes are disposed in a sensor electrode pattern that comprises a first plurality of sensor electrodes 202 (e.g., 15 shown) and a second plurality of sensor electrodes 211 (e.g., 30 shown), which are disposed on the same layer as the first plurality of sensor electrodes 202. Sensor electrodes 202 and sensor electrodes 211 are typically ohmically isolated from each other, by use of insulating materials or a physical gap formed between the electrodes to prevent them from electrically shorting to each other. In some configurations, two or more sensing elements 121 may form a larger unit cell 122. A unit cell 122 includes a grouping of sensor electrodes that are repeated within a sensor electrode array 210 and/or in a repeating pattern across the sensing region 120 (e.g., multiple sensor electrode arrays 210). The unit cell 122 is the smallest unit a symmetric grouping of sensor electrodes can be broken into within an electrode pattern formed across the sensing region 120. As illustrated in FIG. 2A, in one example, the unit cell 122 includes two sensing elements 121, which each contain a portion of the sensor electrode 202 and the sensor electrode 211, and thus the unit cell 122 comprises a sensor electrode 202 and two sensor electrodes 211. One will note that the sensor electrode pattern of FIG. 2A may alternatively utilize various sensing techniques, such as mutual capacitive sensing, absolute capacitive sensing, elastive, resistive, inductive, magnetic acoustic, ultrasonic, or other useful sensing techniques, without deviating from the scope of the invention described herein. Sensor electrode 202 maybe be a transmitter and sensor electrode 211 maybe a receiver, or vice versa (the other way around) with typically similar imaging capability.

In one embodiment, as illustrated in FIG. 2A, the sensing elements 121 may comprise a plurality of transmitter and receiver electrodes that are formed in a single layer on a surface of a substrate 209. In one configuration of the input device 295, each of the sensor electrodes may comprise one or more transmitter electrodes (e.g. sensor electrodes 202) that are disposed proximate to one or more receiver electrodes (e.g. sensor electrodes 211). In one example, a transcapacitive sensing method using the single layer sensor electrode design, may operate by detecting the change in capacitive coupling between one or more of the driven transmitter sensor electrodes and one or more of the receiver electrodes, as similarly discussed above. In such embodiments, the transmitter and receiver electrodes may be disposed in such a way such that jumpers and/or extra layers used to form the area of capacitive sensing pixels are not required. In various embodiments, the transmitter electrodes and receiver electrodes may be formed in an array on the surface of a substrate 209 by first forming a blanket conductive layer on the surface of the substrate 209 and then performing an etching and/or patterning process (e.g., lithography and wet etch, laser ablation, etc.) that ohmically isolates each of the transmitter electrodes and receiver electrodes from each other. In other embodiments, the sensor electrodes may be patterned using deposition and screen printing methods. As illustrated in FIG. 2A, these sensor electrodes may be disposed in an array that comprises a rectangular pattern of sensing elements 121, which may comprise one or more transmitter electrodes and one or more receiver electrodes. In one example, the blanket conductive layer used to form the transmitter electrodes and receiver electrodes comprises a thin metal layer (e.g., copper, aluminum, etc.) or a thin transparent conductive oxide layer (e.g., ATO, ITO, Zinc oxide) that is deposited using convention deposition techniques known in the art (e.g., PVD, CVD). In various embodiments, patterned isolated conductive electrodes (e.g., electrically floating electrodes) may be used to improve visual appearance. In one or more of the embodiments described herein, the sensor electrodes are formed from a material that is substantially optically clear, and thus, in some configurations, can be disposed between a display device and the input device user.

The areas of localized capacitive coupling formed between at least a portion of one or more sensor electrodes 202 and at least a portion of one or more sensor electrodes 211 may be termed a "capacitive pixel," "capacitive sensing pixel" or also referred to herein as the sensing element 121. For example, as shown in FIG. 2A, the capacitive coupling in a sensing element 121 may be created by the electric field formed between at least a portion of the sensor electrodes 202 and a sensor electrode 211, which changes as the proximity and motion of input objects across the sensing region changes.

In transcapacitive sensing designs, since a driven transmitter electrode can capacitively couple with multiple receiver electrodes disposed within the sensing region 120, the phrase "directly coupled to" or "directly capacitively coupled to" are used herein to help clarify the capacitive sensing elements that are intended to form a part of a sensing element 121. In general, directly coupled sensor electrodes include a transmitter electrode and a receiver electrode, which is the transmitter electrode's nearest neighbor. One skilled in the art will appreciate that the capacitive coupling between nearest neighbors is believed to be created by the electric fields formed at or near the edges of the nearest neighbor electrodes. Typically, the surface area of a sensor electrode has a much smaller effect on the capacitive coupling between the electrodes. The phrase "adjacent sensor electrodes" is generally used herein to define nearest neighbor sensor electrodes that are only separated by a physical gap or have a minimal capacitive coupling affecting obstruction disposed between the adjacent electrodes. In one example, the transmitter electrode $202_1$ in FIG. 2A can be said to be adjacent to receiver electrode $211_1$, since the sensor electrodes are only separated by a physical gap. In another example, the transmitter electrode $202_2$ can be said to be adjacent to receiver electrode $211_2$ even though a trace 213 may be disposed between the electrodes, since the size of the trace is typically smaller than the useful electrode region of the sensor electrodes. Also, one will note that the measured change in capacitance created by the interaction of an input object 140 and the electric field lines created between the transmitter electrode $202_2$ and receiver electrode $211_2$ is primarily due to the interaction of the input object 140 and the electric field lines that pass through a region that is above the plane, or planes, that the electrodes reside in, such as above the surface of a lens disposed over a portion of the input device 100. Therefore, in this example, the presence of the trace 213 between the transmitter electrode $202_2$ and receiver electrode $211_2$ will have little effect on the measured change in capacitance signal received by the processing system 110 due to the presence of the input object 140 near the transmitter electrode $202_2$ and receiver electrode $211_2$. Elements that would tend to obstruct the capacitive coupling between adjacent sensor electrodes generally include ground planes, portions of a grounded electrode region of another sensor electrode, and other electric field thieving elements.

In some embodiments, the sensing elements 121 are "scanned" to determine these capacitive couplings. The input device 295 may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. In one example, the transmitter electrodes are the sensor electrodes 202 and the receiver electrodes are the sensor electrodes 211. For example, in one configuration, multiple sensor electrodes 202 transmit different transmitter signals according to one or more coding schemes that enable their combined effects on the resulting signals received by the receiving sensor electrodes, or sensor electrodes 211, to be independently determined. The direct effect of a user input which is coupled to the device may affect (e.g. reduce the fringing coupling) of the resulting signals. Alternately, a floating electrode may be coupled to the input and to the transmitter and receiver and the user input may lower its impedance to system ground and thus reduce the resulting signals. In a further example, a floating electrode may be displaced toward the transmitter and receiver which increases their relative coupling. The receiver electrodes, or a corresponding sensor electrode 211, may be operated singly or multiply to acquire resulting signals created from the transmitter signal. The resulting signals may be used to determine measurements of the capacitive couplings at the capacitive pixels, which are used to determine whether an input object is present and its positional information, as discussed above. A set of values for the capacitive pixels form a "capacitive image" (also "capacitive frame" or "sensing image") representative of the capacitive couplings at the pixels. In various embodiments, the sensing image, or capacitive image, comprises data received during a process of measuring the resulting signals received with at least a portion of the sensing elements 121 distributed across the sensing region 120. In one example, a capacitive image, or sensing image, comprises data received during a process of measuring the resulting signals received across all of the sensing elements 121 during a single scan cycle of the sensing region 120. The resulting signals may be received at one instant in time, or by scanning the rows and/or columns of sensing elements distributed across the sensing region 120 in a raster scanning pattern (e.g., serially polling each sensing element separately in a desired scanning pattern), row-by-row scanning pattern, column-by-column scanning pattern or other useful scanning technique. In many embodiments, the rate that the "sensing image" is acquired by the input device 100, or sensing frame rate, is between about 60 and about 180 Hertz (Hz), but can be higher or lower depending on the desired application.

In some touch screen embodiments, the sensing elements 121 are disposed on a substrate of an associated display device. For example, the sensor electrodes 202 and/or the sensor electrodes 211 may be disposed on a polarizer, a color filter substrate, or a glass sheet of an LCD. As a specific example, the sensor electrodes 202 and 211 may be disposed on a TFT (Thin Film Transistor) substrate of an LCD type of the display device, a color filter substrate, on a protection material disposed over the LCD glass sheet, on a lens glass (or window), and the like. The electrodes may be separate from and in addition to the display electrodes, or shared in functionality with the display electrodes. Similarly, an extra layer may be added to a display substrate or an additional process such as patterning applied to an existing layer.

In some touchpad embodiments, the sensing elements 121 are disposed on a substrate of a touchpad. In such an embodiment, the sensor electrodes in each sensing element 121 and/or the substrate may be substantially opaque. In some embodiments, the substrate and/or the sensor electrodes of the sensing elements 121 may comprise a substantially transparent material.

In those embodiments, where sensor electrodes of each of the sensing elements 121 are disposed on a substrate within the display device (e.g., color filter glass, TFT glass, etc.), the sensor electrodes may be comprised of a substantially transparent material (e.g., ITO, ATO, ClearOhm™) or they may be comprised of an opaque material and aligned with the pixels of the display device. Electrodes may be considered substantially transparent in a display device if their reflection (and/or absorption) of light impinging on the display is such that human visual acuity is not disturbed by their presence. This may be achieved by matching indexes of refraction, making opaque lines narrower, reducing fill percentage or making the percentage of material more uniform, reducing spatial patterns (e.g. moiré) that are with visible to the human eye, and the like.

In one configuration, as illustrated in FIG. 2A and further discussed below, the processing system 110 of the input device 295 comprises a sensor controller 218 that is coupled through connectors 217 to each of the transmitter and receiver electrodes, such as sensor electrodes 202 and 211, through one or more traces (e.g., traces 212 and 213), respectively. In one embodiment, the sensor controller 218 is generally configured to transmit the transmitter signal and receive the resulting signals from receiver electrodes. The sensor controller 218 is also generally configured to communicate the positional information received by the sensing elements 121 to the electronic system 150 and/or the display controller 233, which is also coupled to the electronic system 150. The sensor controller 218 may be coupled to the electronic system 150 using one or more traces 221 that may pass through a flexible element 251 and be coupled to the display controller 233 using one or more traces 221A that may pass through the same flexible element 251 or a different connecting element, as shown. While the processing system 110 illustrated in FIG. 2A schematically illustrates a single component (e.g., IC device) to form the sensor controller 218, the sensor controller 218 may comprise two or more controlling elements (e.g., IC devices) to control the various components in the processing system 110 of the input device 295. The controller devices may be placed onto display substrates such as TFT or Color Filter/Sealing layers (e.g., as a Chip On Glass).

In one configuration, the functions of the sensor controller 218 and the display controller 233 may be implemented in one integrated circuit that can control the display module elements and drive and/or sense data delivered to and/or received from the sensor electrodes. In various embodiments, calculation and interpretation of the measurement of the resulting signals may take place within the sensor controller 218, display controller 233, a host electronic system 150, or some combination of the above. In some configurations, the processing system 110 may comprise a transmitter circuitry, receiver circuitry, and memory that is disposed within one or any number of ICs found in the processing system 110, depending to the desired system architecture.

Figure 2B:
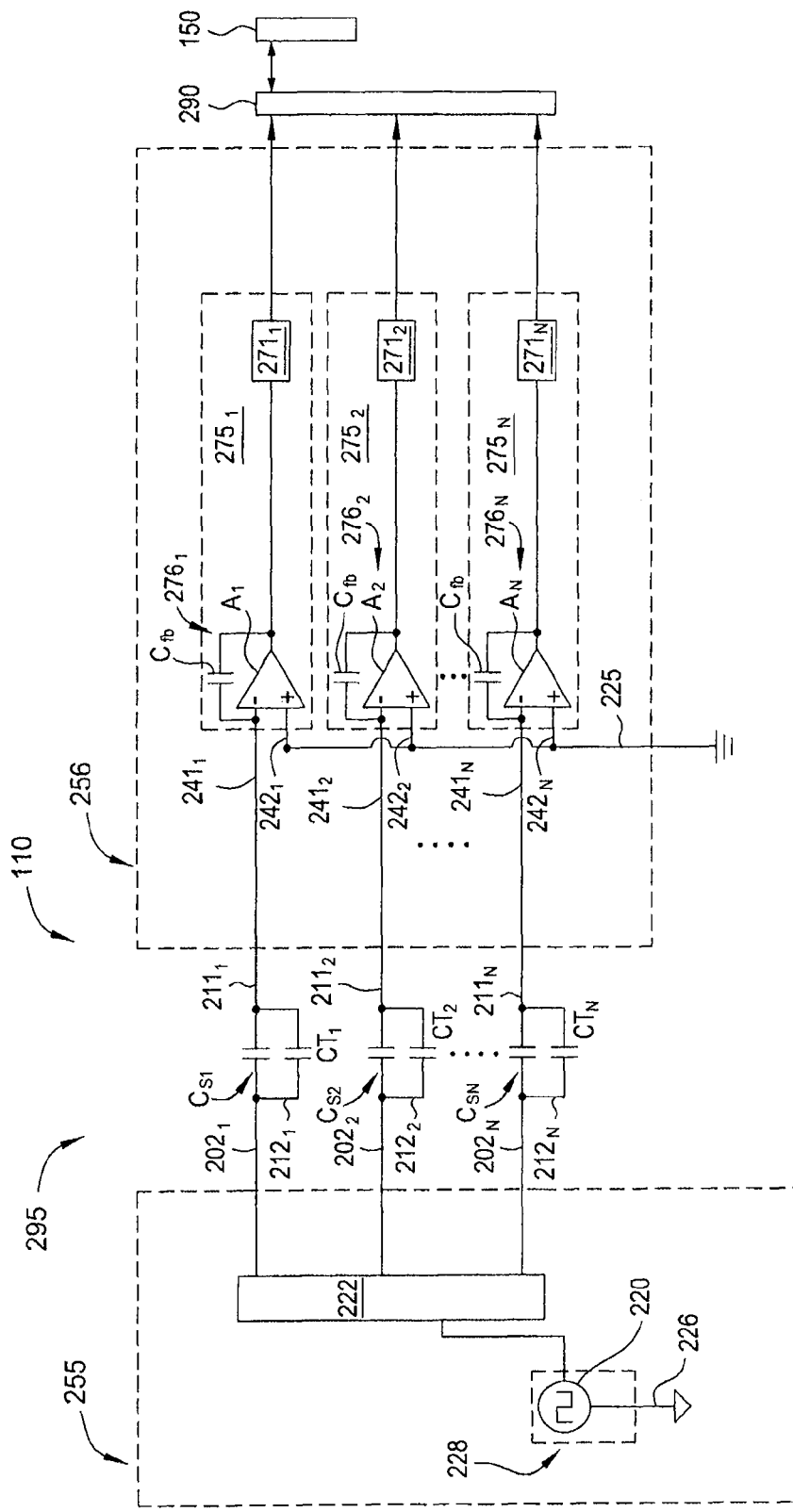
FIG. 2B is a schematic diagram illustrating a portion of an input device, according to one or more of the embodiments described herein.

FIG. 2B is a schematic view of a portion of the processing system 110 of the input device 295 according to one or more of the embodiments described herein. In one configuration, the sensor controller 218 includes a signal generating processor 255 and sensor processor 256 that work together to provide touch sensing data to an analysis module 290 and the electronic system 150. The analysis module 290 may be part of the processing system 110, the sensor processor 256 and/or part of the electronic system 150. In various embodiments, the analysis module 290 will comprises digital signal processing elements and/or other useful digital and analog circuit elements that are connected together to process the receiver channel output signal(s) received from at least one receiver channel that is coupled to a receiver electrode, and also provide processed signals to other portions of the electronic system 150. The electronic system 150 can then use the processed signals to control some aspect of the input device 295, such as send a message to the display, perform some calculation or software related task based on instructions created by one or more software programs that are being run by the electronic system and/or perform some other function.

As illustrated in FIG. 2B, the signal generating processor 255 and the sensor processor 256 work together to provide receiver channel output signals to the analysis module 290 and/or the electronic system 150. As discussed above, the positional information of an input object 140 (FIG. 1) is derived based on the capacitance $C_S$ (e.g., capacitance $C_{S1}$, $C_{S2}$, ... $C_{SN}$) measured between each of the transmitter electrodes (e.g., sensor electrodes $202_1$, $202_2$, ... $202_N$) and the receiver electrodes (e.g., sensor electrodes $211_1$, $211_2$, ... $211_N$), wherein N is a positive integer.

Each of the transmitter electrodes (e.g., sensor electrodes $202_1$, $202_2$, ... $202_N$ in FIG. 2B) is connected to a trace (e.g., traces $212_1$, $212_2$, ... $212_N$ in FIG. 2B). Each trace has a certain amount of capacitance (e.g., transcapacitance) that is formed between the trace and the corresponding receiver electrode. As illustrated in FIG. 2B, the capacitance between a trace and a receiver is given by capacitance $C_T$ (e.g., capacitance $C_{T1}$, $C_{T2}$, ... $C_{TN}$) and can be measured between each of the trace (e.g., traces $212_1$, $212_2$, ... $212_N$) and a receiver electrode (e.g., $211_1$, $211_2$, ... $211_N$) at various points along the trace (e.g., Y-direction in FIG. 2C), where N is a positive integer. As shown, each trace capacitance $C_T$ (e.g., capacitance $C_{T1}$, $C_{T2}$, ... $C_{TN}$) is in parallel with a transmitter capacitance $C_S$ (e.g., capacitance $C_{S1}$, $C_{S2}$, ... $C_{SN}$). Parasitic capacitance occurs where an input object is positioned over a trace and the input device detects a change in the capacitance at an associated pixel (e.g., sensed resulting signal provided by the associated sensing element 121), due to the change in the trace capacitance $C_T$ (e.g., capacitance $C_{T1}$, $C_{T2}$, ... $C_{TN}$).

In one embodiment, as shown in FIG. 2B, the signal generating processor 255 comprises a driver 228, which are adapted to deliver capacitive sensing signals (transmitter signals) to the transmitter electrodes. In one configuration, the driver 228 may comprise a power supply and signal generator 220 that is configured to deliver a square, rectangular, trapezoidal, sinusoidal, Gaussian or other shaped waveforms used to form the transmitter signal(s) to the transmitter electrodes. In one configuration, the signal generator 220 comprises an electrical device, or simple switch, that is able to deliver a transmitter signal that transitions between the output level of the power supply and a low display voltage level. In various embodiments, signal generator 220 may comprise an oscillator. In some configurations, the signal generator 220 is integrated into the driver 222, which includes one or more shift registers (not shown) and/or switches (not shown) that are adapted to sequentially deliver transmitter signals to one or more of the transmitter electrodes at a time.

In one embodiment, as shown in FIG. 2B, the sensor processor 256 comprises a plurality of receiver channels 275 (e.g., receiver channels $275_1$, $275_2$, ... $275_N$) that each have a first input port 241 (e.g., ports $241_1$, $241_2$, ... $241_N$) that is configured to receive the resulting signal received with at least one receiver electrode (e.g., sensor electrode $211_1$, $211_2$, ... $211_N$), a second input port (e.g., ports $242_1$, $242_2$, ... $242_N$) that is configured to receive a reference signal delivered through the line 225, and an output port coupled to the analysis module 290 and electronic system 150. Typically, each receiver channel 275 is coupled to a single receiver electrode. Each of the plurality of receiver channels 275 may include a charge accumulator 276 (e.g., charge accumulators $276_1$, $276_2$, ... $276_N$), supporting components 271 (e.g., components $271_1$, $271_2$, ... $271_N$) such as demodulator circuitry, a low pass filter, sample and hold circuitry, other useful electronic components filters and analog/digital converters (ADCs) or the like. The analog/digital converter (ADC) may comprise, for example, a standard 8, 12 or 16 bit ADC that is adapted to receive an analog signal and deliver a digital signal (receiver channel output signal) to the analysis module 290 (e.g. a Successive Approximation ADC, a Sigma-Delta ADC, an Algorithmic ADC, etc). In one configuration, the charge accumulator 276 includes an integrator type operational amplifier (e.g., Op Amps $A_1$-$A_N$) that has an integrating capacitance $C_{fb}$ that is coupled between the inverting input and the output of the device. Due to the type of electronic elements required to detect and process the received resulting signals, the cost required to form the each receiver channel 275 is generally more expensive than the cost required to form the components in the signal generating processor 255 that provides the transmitter signal(s) to a transmitter electrode(s). However, in some embodiments of the invention, it is desirable to reduce the number of transmitter electrodes to increase the scanning speed of the capacitive sensing type input device. In these configurations, it is generally desirable to maintain the same capacitive pixel density to maintain the input object position sensing accuracy. One skilled in the art will appreciate that delivering a capacitive sensing signal to a single transmitter electrode and then measuring the resulting signals on all of the receiver electrodes in the sensing region would provide a much faster capacitive sensing scanning process than sequentially delivering capacitive sensing signals in time to two or more transmitters then sensing the received resulting signals after each sequential scanning step.

Moreover, there is a benefit to reducing the number of traces used in an input device, since this will reduce the complexity and cost of the input device. The sensing region 120 of most typical 3 inch up to 15 inch diagonal handheld devices today, such as a tablet, PDA or other similar device, require hundreds or even thousands of sensing elements 121 to reliably sense the position of one or more input objects. The reduction in the number of traces that need to be routed to the various processing system 110 components is desirable for a number of reasons, which include a reduction in the overall cost of forming the input device 100, a reduction in the complexity of routing the multitude of traces within the sensing region 120, a reduced interconnecting trace length due to reduced routing complexity, a reduction in the cross-coupling of signals between adjacently positioned traces, and allowing for a tighter packing or increased density of sensor electrodes within the sensing region 120. The reduction in the number of traces will also reduce the amount of cross-coupling between the traces due to a reduction in the required trace density and number of traces that will transmit or receive signals delivered to or from adjacently positioned sensor electrodes or traces. One or more of the embodiments described herein, includes an electrode array design that is configured to reduce or minimize the number of traces and/or electrodes required to sense the position of an input object within the sensing region 120 using capacitive pixels that contain unique pairs of sensor electrodes to reliably determine the position of an input object. In some transcapacitive sensing embodiments, transmitter and/or receiver type sensor electrodes are interconnected together to reduce the number of traces that need to be coupled to the processing system components. Reducing the number of electrode connections, and thus supporting components (e.g., receiver channels), may allow for designs that can reduce the production cost and system complexity, even when a larger number of electrodes are required.

Figure 2C:
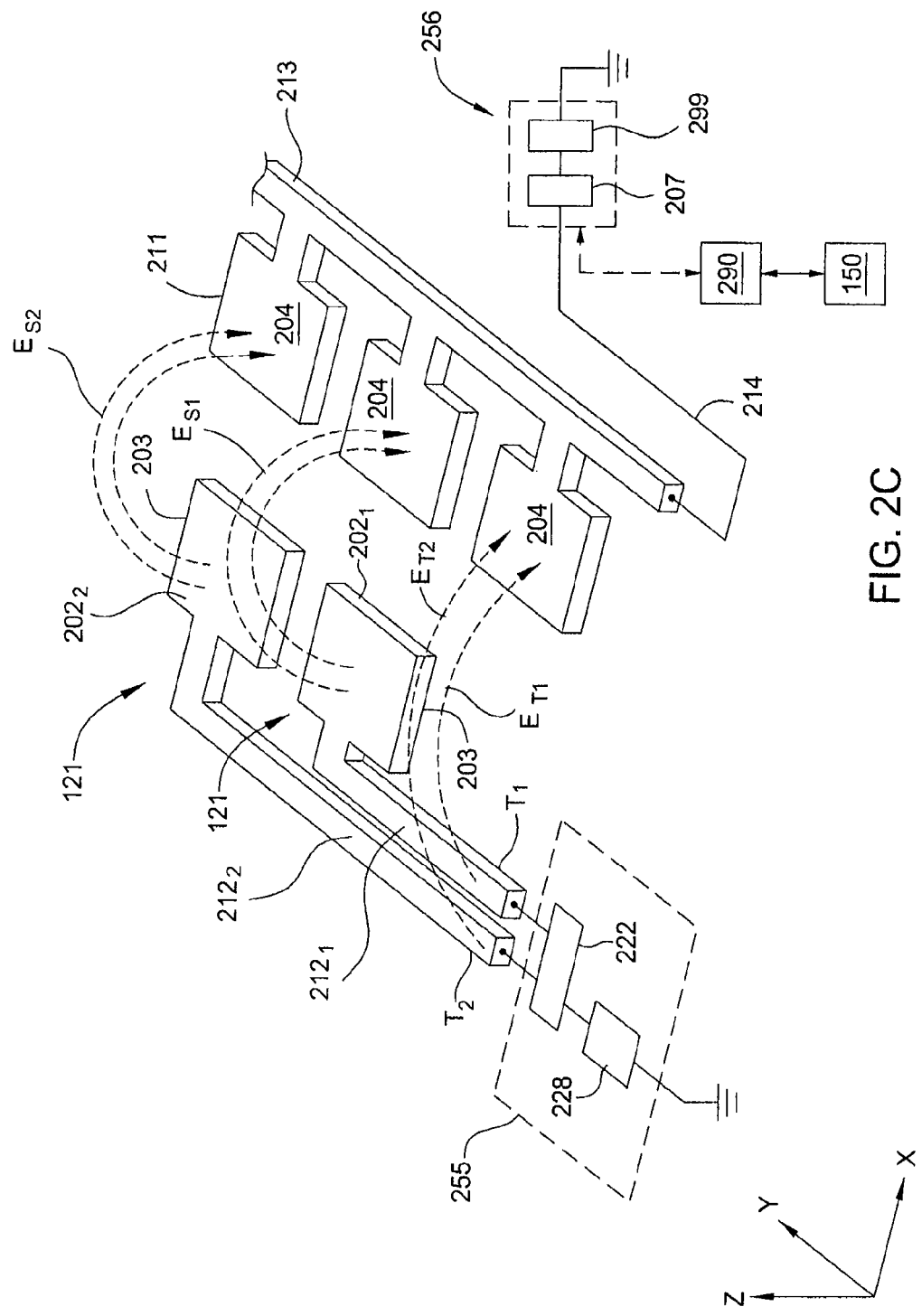
FIG. 2C is a schematic view of sensing elements disposed in an array of sensing elements (not shown) of the input device, according to one or more of the embodiments described herein.

FIG. 2C is a schematic view of sensing elements 121 disposed in an array of sensing elements (not shown) of the input device 100, which is part of the processing system 110 of an input device 295 according to one or more of the embodiments described herein. As illustrated in FIG. 2C, and discussed herein, a sensor electrode found in a sensing elements 121 will generally comprise an electrode region and a trace. In one example, a sensor electrode includes an electrode region 203, 204 and a trace 212, 213, respectively. For simplicity, only two transmitter electrodes (202$_1$, 202$_2$) are shown, and thus each of the two sensing elements 121 illustrated in FIG. 2C comprises a transmitter electrode 202$_1$ or 202$_2$ and a portion of a group of the interconnected electrode regions 204 that form the receiver electrode 211. As illustrated in FIG. 2C, the electrode regions 204 of the receiver electrode 211 interact with the electrode regions 203 of the two transmitter electrodes 202$_1$, 202$_2$ and two corresponding traces 212$_1$, 212$_2$ when a sensing signal is provided to the transmitter electrodes in the each sensing element 121. The processing system 110 includes a signal generating processor 255 and a sensor processor 256 that work together to provide capacitive sensing receiver channel output signals to the analysis module 290 and electronic system 150. As discussed above, the processing system derives the positional information of an input object 140 (FIG. 1) based on the capacitance measured between each of the transmitter electrodes and the receiver electrodes contained in the sensing region 120. In various embodiments, the sensor processor 256 comprises digital signal processing elements and/or other useful digital and analog circuit elements that are connected together to process the receiver channel output signal(s) received from at least one receiver channel that is coupled to each of the receiver (Rx) electrodes 211. The electronic system 150 can then use the processed signals to control some aspect of the input device 295, such as send a message to the display, perform some calculation or software related task based on instructions created by one or more software programs that are being run by the electronic system and/or perform some other function.

In one embodiment, as shown in FIG. 2C, the signal generating processor 255 comprises a driver 228, which is adapted to sequentially deliver capacitive sensing signals (transmitter signals) to the transmitter (Tx) electrodes 202$_1$, 202$_2$ in the array of sensing elements. In one configuration, the driver 228 may comprise a power supply and signal generator that is configured to deliver a square, rectangular, trapezoidal, sinusoidal, Gaussian or other shaped waveforms used to form the transmitter signal(s) to the transmitter electrodes. In one configuration, the signal generator comprises an electrical device, or simple switch, that is able to deliver a transmitter signal that transitions between the output level of the power supply and a low display voltage level.

In one embodiment, as shown in FIG. 2C, the sensor processor 256 comprises a plurality of receiver channel(s) 207 that each have a first input port 241 that is configured to receive the resulting signal received by at least one receiver electrode 211, and an output port coupled to the analysis module 290. Typically, each receiver channel 207, which can be the same as a receiver channel 275 discussed above, may be coupled to a single receiver electrode 211. In one configuration, the sensor processor 256 further comprises an electromagnetic interference (EMI) filter 299 that is adapted to filter EMI induced by other input device components.

Traces 212$_1$, 212$_2$ connect the driver 222 to the transmitter electrodes 202$_1$, 202$_2$, respectively. For example, trace 212$_1$ connects the driver 222 to transmitter electrode 202$_1$ and trace 212$_2$ connects the driver 222 to transmitter electrode 202$_2$. The capacitance between trace 212$_1$ and the receiver electrode 211 is associated with an electric field $E_{T1}$. The capacitance between trace 212$_2$ and the receiver electrode 211 is associated with an electric field $E_{T2}$. The capacitance between transmitter electrode 202$_1$ and the receiver electrode 211 is associated with an electric field $E_{S1}$. The capacitance between transmitter electrode 202$_2$ and the receiver electrode 211 is associated with an electric field $E_{S2}$.

Where an input object (e.g., finger) is positioned near, such as over a electrode region 203 of a transmitter electrode 202$_1$, 202$_2$ and an electrode region 204 of a receiver electrode 211, the associated trace will also see a change in capacitance (and corresponding electric field). For example, if an input object (e.g., finger) is over transmitter electrode 202$_1$, the electric field $E_{S1}$ tends to change, along with the electric field $E_{T1}$ generated between trace 212$_1$ and the receiver electrode 211. Likewise, if an input object (e.g., finger) is over transmitter electrode Es$_2$, the electric field $E_{S2}$ tends to change along with the electric field $E_{T2}$ generated between the trace 212$_2$ and the receiver electrode 211.

Likewise, where an input object (e.g., finger) is near a trace 212$_1$, 212$_2$, when a sensing signal is provided a change in capacitance (and corresponding electric field) between the trace and the receiver electrode 211 will be measured by the sensor processor 256. The position of the input object near a trace 212$_1$, 212$_2$ will cause a change in the electric field generated between the trace and the receiver electrodes, and thus affect the measured resulting signal measured by the sensor processor 256. For example, if an input object (e.g., finger) is over trace 212$_1$, the electric field $E_{T1}$ tends to change, which is seen as a change in the resulting signal delivered by the transmitter electrode 202$_1$ to the receiver electrode 211. Likewise, if an input object (e.g., finger) is over trace 212$_2$, the electric field $E_{T2}$ tends to change, which is seen as a change in the resulting signal delivered by the transmitter electrode 202$_2$ to the receiver electrode 211. The capacitance changes at the traces 212$_1$, 212$_2$ also affect the capacitive coupling of the connected transmitter electrode(s) 202$_1$, 202$_2$ to the receiver electrode 211, respectively. Such capacitance changes associated with an input object (e.g., finger) being over a trace may be referred to as "parasitic capacitance." As further described below, the input device is configured to correct parasitic capacitance in order to carry out object detection algorithms more accurately.

Figure 3:
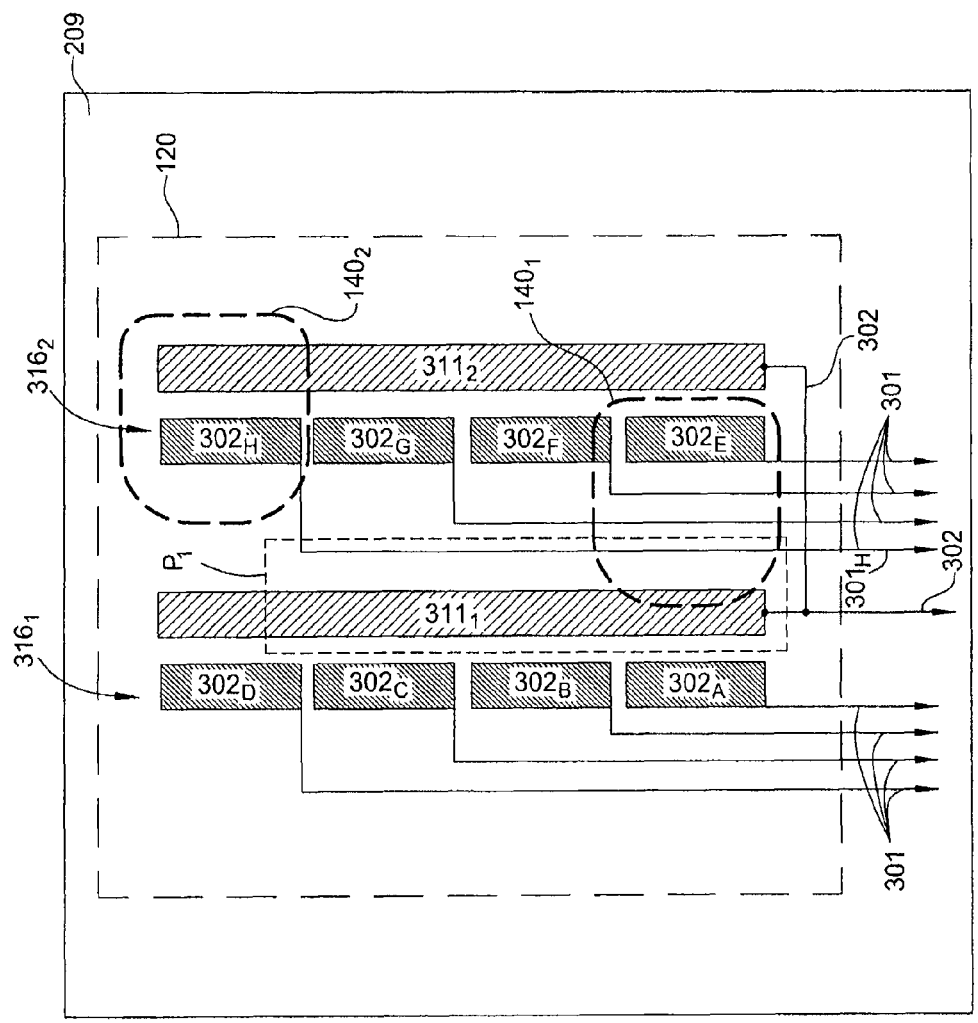
FIG. 3 schematically illustrates a sensor electrode configuration according to one or more of the embodiments described herein.

FIG. 3 is an enlarged schematic view of a portion of a sensing region 120 formed on a substrate 209 that includes a plurality of sensor electrodes that are used to sense the position of an input object within the sensing region 120 using a transcapacitive sensing method. As illustrated in FIG. 3, the input device 100 includes two arrays of transmitter electrodes 316 and two receiver electrodes 311. The first array of transmitter electrodes $316_1$ includes transmitter electrodes 302A-302D that are each coupled to a separate trace 301 and the second array of transmitter electrodes $316_2$ include transmitter electrode regions 302E-302H that are each coupled to a separate trace 301. For ease of discussion purposes, FIG. 3 only includes one receiver electrode $311_1$ that is positioned to directly couple with the transmitter electrodes 302A-302D in the first array of transmitter electrodes $316_1$ and only one receiver electrode $311_2$ that is positioned to directly couple with the transmitter electrode regions 302E-302H in the second array of transmitter electrodes $316_2$. The configuration of sensor electrodes shown in FIG. 3 is not intended to be limiting as to the scope of the invention described herein.

As noted above, to reduce the overall cost of forming the input device 100, reduce the system complexity, reduce the cross-coupling of signals between adjacently positioned traces and the costs to detect and process the resulting signals generated during a capacitive sensing process, the receiver electrodes $311_1$ and $311_2$ are electrically coupled together, such that a single trace 302 is connected to the processing system 110 components (not shown), such as the sensor controller 218 (not shown). A reduction in the cost of the overall input system can be realized by reducing the number of electrode traces, especially by reducing the number of traces that are coupled to receiver electrodes, due to the cost required to form the components used to receive and process the received resulting signals. Therefore, in some embodiments, it is desirable to interconnect at least two sensor electrodes, or two or more sensor electrodes in two different arrays of sensor electrodes, that are positioned a distance apart from each other within the sensing region 120. By interconnecting the sensor electrodes prior to their connection to the processing system components the number of traces that are required to couple with the processing system 110 components will be reduced. In one example, the traces of multiple receiver electrodes are electrically coupled together to reduce the number of required connections made to the signal processing components within the sensor processor 256 (e.g., receiver channels 275) in the processing system 110. Therefore, in this example, the ratio of the number of transmitter to receiver traces is greater than one. In this case, by coupling the receiver electrodes together the number of required receiver channels will be reduced, thus reducing the cost and complexity of the processing system 110. However, in some configurations, it is also desirable to have more transmitter electrodes regions than receiver electrodes regions (e.g., ratio of transmitter to receiver electrodes is greater then one), since a fully enabled transmitter electrode generally costs less to manufacture than a fully enabled receiver electrode. In another example, the traces of multiple transmitter electrodes are electrically coupled together to reduce the number of required connections made to the signal driving components within the generating processor 255 in the processing system 110 and/or to improve the scanning speed of the input device. In yet another example, both the number of traces used to couple the transmitter electrodes and the receiver electrodes to their various signal processing components are reduced by interconnecting the traces of each type of electrode. However, in cases where both types of transcapacitive sensing electrodes are each coupled to electrodes of the same type (e.g., transmitter electrodes to transmitter electrodes and receiver electrodes to receiver electrodes) this can lead to capacitive sensing issues associated with correctly determining the position of an input object. Therefore, as will be discussed further below, some embodiments of the invention include interconnected electrodes that only form unique pairs of transmitter and receiver electrodes.

In some sensor electrode configurations, as illustrated in FIG. 3, the interconnection between some types of sensor electrodes, such as receiver electrodes $311_1$ and $311_2$ can lead to misleading or false input object position determination(s) by the processing system. The misleading or false determination of the input objects position can be due to the cross-coupling between transmitter electrodes and/or transmitter electrode traces and the two or more receiving electrodes that are interconnected together within the sensing region 120. In one example, due to the interconnection of the two receiver electrodes $311_1$ and $311_2$, as shown in FIG. 3, the processing system will not be able to determine whether an input object 140 is in the first input object position $140_1$ or in the second input object position $140_2$. This problem may arise from the cross-coupling of the trace 301H and the first receiver electrode $311_1$ and the intended direct coupling of the electrode region 302H and the second receiver electrode $311_2$, since the connection formed between the receiver electrodes $311_1$ and $311_2$ will not allow the processing system 110 to determine if the input object is over the first receiver electrode $311_1$ or the second receiver electrode $311_2$. One skilled in the art will appreciate that when the sensor electrode region 302H is driven for capacitive sensing, the trace 301H will capacitively couple to the first sensor electrode 311 (e.g., within region $P_1$) and the electrode region 302H will directly couple to the second sensor electrode $311_2$. Since the input object could be in more than one position within the sensing region 120 (e.g., input object position $140_1$ or $140_2$), and still provide the same or a similar resulting signal to the sensor processor portion of the processing system, it is not possible to determine the actual position of the input object.

Therefore, in an effort to resolve some of the capacitive sensing limitations with configurations similar to the example shown in FIG. 3, a revised sensor electrode layout that is able to accurately sense the position of an input object 140, while also having a reduced number of interconnecting traces is needed. FIGS. 4-8 illustrate a few examples of various configurations that can be used to meet these goals. These examples are provided herein to help explain various aspects of the invention and are not intended to limit the scope of the invention described herein. While FIGS. 4-8 illustrate a sensor electrode configuration that includes one or more arrays of receiver electrodes, such as arrays of sensor electrodes 416 containing sensor electrode regions 411A and 411B, that are interconnected to form two groups of sensor electrodes, this configuration is not intended to be limiting as to the scope of the invention described herein. One skilled in the art will appreciate that one or more of the arrays of sensor electrodes could be formed so that it contains more or less groups of receiver electrodes that contain one or more sensor electrodes without deviating from the scope of the invention described herein. Also, while FIGS. 4-8 illustrate a sensor electrode configuration that includes one or more arrays of transmitter electrodes, such as arrays of sensor electrodes 415, which contain a plurality of sensor electrodes 402, for example may include sensor electrode regions 402A-402H (FIG. 4), that are each separately connected to the processing system 110 through a trace 412, this configuration is not intended to be limiting as to the scope of the invention described herein. One skilled in the art will appreciate that one or more of the separately connected traces 412 can be interconnected inside or outside of the sensing region 120 before they are coupled with the processing system 110 components without deviating from the scope of the invention described herein.

Figure 4:
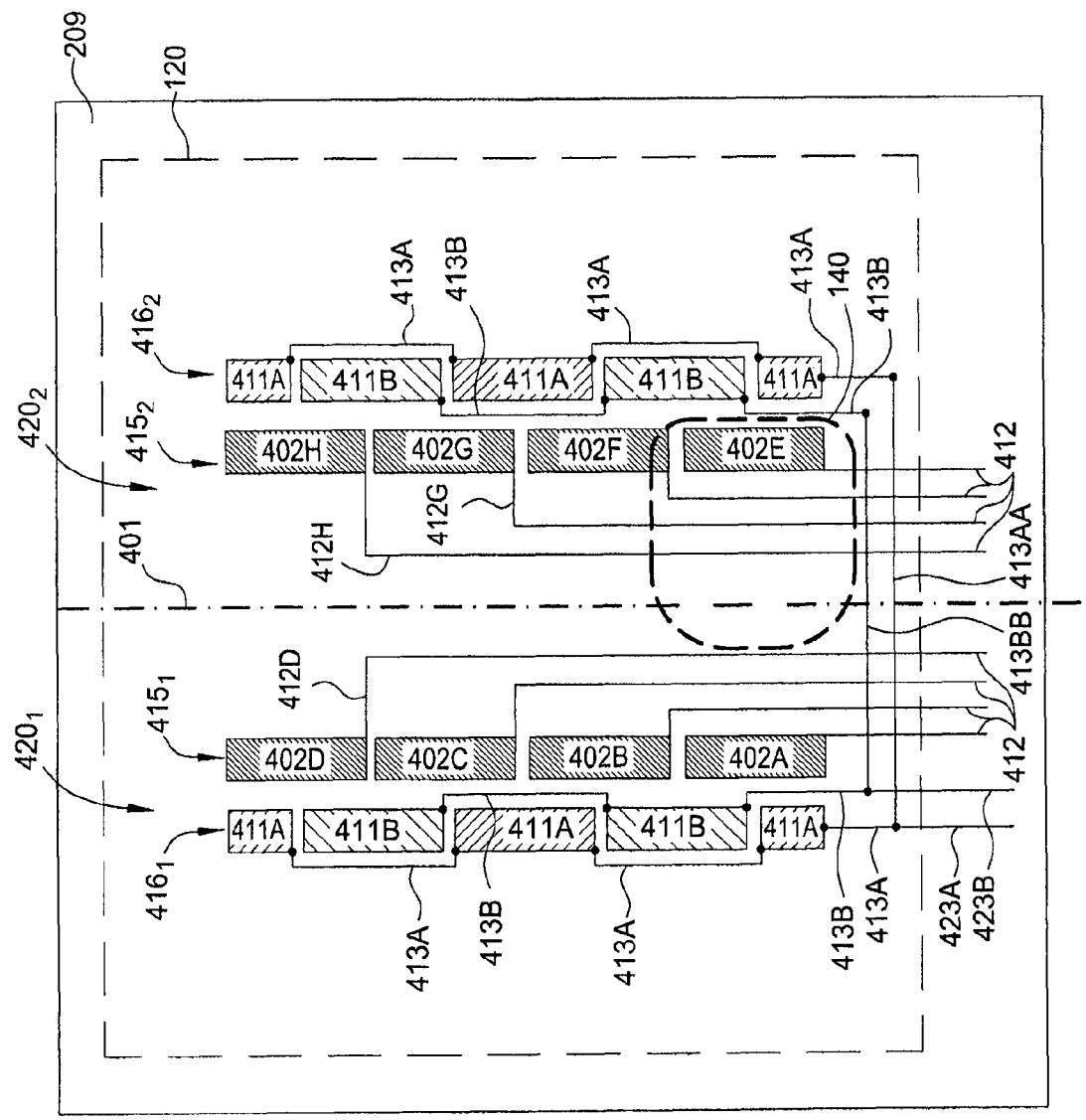
FIG. 4 is a schematic diagram illustrating two sets of sensor electrode arrays, which are disposed within a portion of a sensing region and each include arrays of sensor electrodes, according to one or more of the embodiments described herein.

FIG. 4 is an enlarged schematic view of a portion of a sensing region 120 formed on a substrate 209 that includes a plurality of sensor electrodes that are used to accurately sense the position of an input object within the sensing region 120 using a transcapacitive sensing method. The input device 100 in this example includes two sets of sensor electrode arrays $420_1$, $420_2$ that each include an array of transmitter electrodes $415_1$ or $415_2$ and an array of receiver electrodes $416_1$ or $416_2$. In some of the transcapacitive sensing embodiments described herein, a set of sensor electrode arrays generally includes at least one array of transmitter electrodes and at least one array of receiver electrodes that are used together to form an array of sensing elements 121. The first array of transmitter electrodes $415_1$ includes transmitter electrode regions 402A-402D that are each coupled to a separate trace 412 and the second array of transmitter electrodes $415_2$ includes transmitter electrode regions 402E-402H that are each coupled to a separate trace 412. The first array of receiver electrodes $416_1$ and second array of receiver electrodes $416_2$ each include a plurality of sensor electrodes that include receiver electrode regions 411A, 411B and traces 413A, 413B. The receiver electrode regions 411A and 411B in the first and second electrode arrays $416_1$, $416_2$ are each separately coupled together using a trace 413A or 413B, respectively. By coupling the sensor electrodes in the first and second arrays of receiver electrodes $416_1$, $416_2$ together, the number of required connections to the processing system 110 is reduced. A conventional sensing electrode design that requires one trace per receiver electrode would require 10 separate traces and connections (e.g., 10 electrode regions 411A and 411B) to the processing system 110 components (FIG. 2A), such as the sensor controller 218 (FIG. 2A). By connecting the sensor electrodes in the first and second arrays of receiver electrodes into one or more groups of sensor electrodes the number of separate traces and connections can be reduced. In this example, two groups of interconnected sensor electrodes are formed by interconnecting the electrode regions 411A and 411B using the traces 413A and 413B, respectively, in each array of sensor electrodes. Therefore, each of the two groups of electrode in the arrays of sensor electrodes $416_1$, $416_2$ are interconnected via the interconnection traces 413AA, 413BB, respectively, so that only two separate traces 423A and 423B are required to separately connect the two groups of sensor electrodes with the processing system 110 components.

Due to the separate interconnection of transmitter electrode configuration, which is illustrated in FIG. 4, each of the formed sensing elements contain unique pairs of transmitter and receiver electrodes that have a reduced total interconnection trace count from most conventional electrode configurations. As noted above, embodiments of the invention may provide an electrode configuration that comprises multiple arrays of capacitive pixels that each includes unique pairs of sensor electrodes to reliably determine the position of an input object. Unique pairs to sensor electrodes generally include configurations where a first pair of sensor electrodes in a first capacitive pixel are both not interconnected with another pair of sensor electrodes in any of the other capacitive pixels in the sensing region. For example, a pixel that includes a portion of the sensor electrode region 402D and a portion of sensor electrode region 411B in the array of sensor electrodes $415_1$ would not be unique from a pixel that includes a portion of the sensor electrode region 402G and a portion of sensor electrode region 411B in the array of sensor electrodes $415_2$ if the traces 412D and 412G were connected together so that these sensor electrodes send or receive capacitive sensing signals at the same time, since both of the electrodes of the same type are connected together and are used in the same two pixels (e.g., electrode regions 402D and 402G are connected together and electrode regions 411B in the array of sensor electrodes $415_1$ and electrode regions 411B in the array of sensor electrodes $415_2$ are connected together via the interconnection trace 413BB). The presence of non-unique directly coupled pairs of sensing electrodes will typically lead to false and misleading input object position determinations as discussed above.

In an effort to further reduce the problems associated with the configurations similar to the one illustrated in FIG. 3, in some embodiments, the arrays of transmitter electrodes 415, and their associated traces 412, are positioned next to each other with no intervening array(s) of receiver electrodes 416 between them. By positioning the arrays of transmitter electrodes 415 and associated traces 412 next to each other the cross-coupling of the traces 412 and either of the arrays of receiver electrodes $416_1$, $416_2$ is minimized, and the cross-coupling of transmitter electrodes in an array of transmitter electrodes that are not positioned to directly couple with the arrays of receiver electrodes $416_1$, $416_2$ is avoided. In this configuration, the arrays of transmitter electrodes 415 and associated traces 412 are positioned next to each other and are disposed between two or more arrays of receiver electrodes 416. In one example, when the sensor electrode region 402H is driven for capacitive sensing, the trace 412H is not positioned so that it will capacitively couple to the first sensor electrode region 411A or the second sensor electrode region 411B in the first or second arrays of sensor electrodes $415_1$ or $415_2$.

In one embodiment, two or more arrays of transmitter electrodes (e.g., arrays $415_1$ and $415_2$) are positioned adjacent to each other so that the gaps between the electrode regions 402A-402D and electrode regions 402E-402H is minimized by reducing the gaps formed between the traces and transmitter electrodes, while still being ohmically isolated from each other. The reduction in the gaps formed between the traces and transmitter electrodes will also improve the density of sensing elements 121 formed within the sensing region 120. In this example, one sensing element 121 is formed between electrode region 402D and the uppermost electrode region 411A in the first array of receiver electrodes $416_1$ and another sensing element 121 is adjacently formed between electrode region 402H and the uppermost electrode region 411A in the second array of receiver electrodes $416_2$.

In some sensor electrode configurations discussed herein, the arrays of sensor electrodes (e.g., transmitter and/or receiver electrodes) include a plurality of sensor electrode regions (e.g., electrode regions 402A-402D or 411A-411B) that are aligned along a first direction, such as the Y-direction shown in FIG. 4. In one example, the centroid of the area of the electrode regions in an array of sensor electrodes (e.g., electrode regions 402A-402D) are aligned along a first direction. In another example, an edge of the electrode regions in an array of sensor electrodes are aligned along a first direction. In yet another example, where the edge(s) of the electrode regions are non-linear, the alignment of the electrode regions may be found by comparing the orientation and alignment of the major axis of symmetry of the electrode regions.

In one embodiment, two or more arrays of sensing electrodes (e.g., arrays of sensor electrodes $415_1$ and $415_2$) are positioned adjacent to each other and are symmetric about a linear (e.g., axis) and/or non-linear symmetry line, so that a regular pattern of sensing elements 121 are formed across the sensing region 120. In one example, as shown in FIG. 4, the first array of transmitter electrodes $415_1$ and second array of transmitter electrodes $415_2$ are symmetric about a symmetry line 401, which in this example happens to be linear. As illustrated in FIG. 4, the electrode regions 402A-402D, and their associated traces 412, and electrode regions 402E-402H, and their associated traces 412, are also mirror images of each other. Also, in some configurations, as illustrated in FIG. 4 the sets of sensor electrode arrays $420_1$, $420_2$ may be positioned a distance apart in a second direction (e.g., X-direction) that is orthogonal to or at an angle with a first direction that is parallel to the symmetry line and/or parallel to an alignment direction of an array of sensor electrodes (e.g., Y-direction for the electrode regions 402A-402D).

Due to the layout of the sensing electrodes disclosed herein, during operation an input object 140 that is positioned over or near the electrode region 402E and traces 412 will primarily couple to the receiving electrodes in the second array of receiver electrodes $416_2$. Thus, by orienting the electrodes in this way the cross-coupling of the input object and the other connected receiver electrodes in the first array of receiver electrodes $416_1$ is reduced or completely removed.

Figure 5:
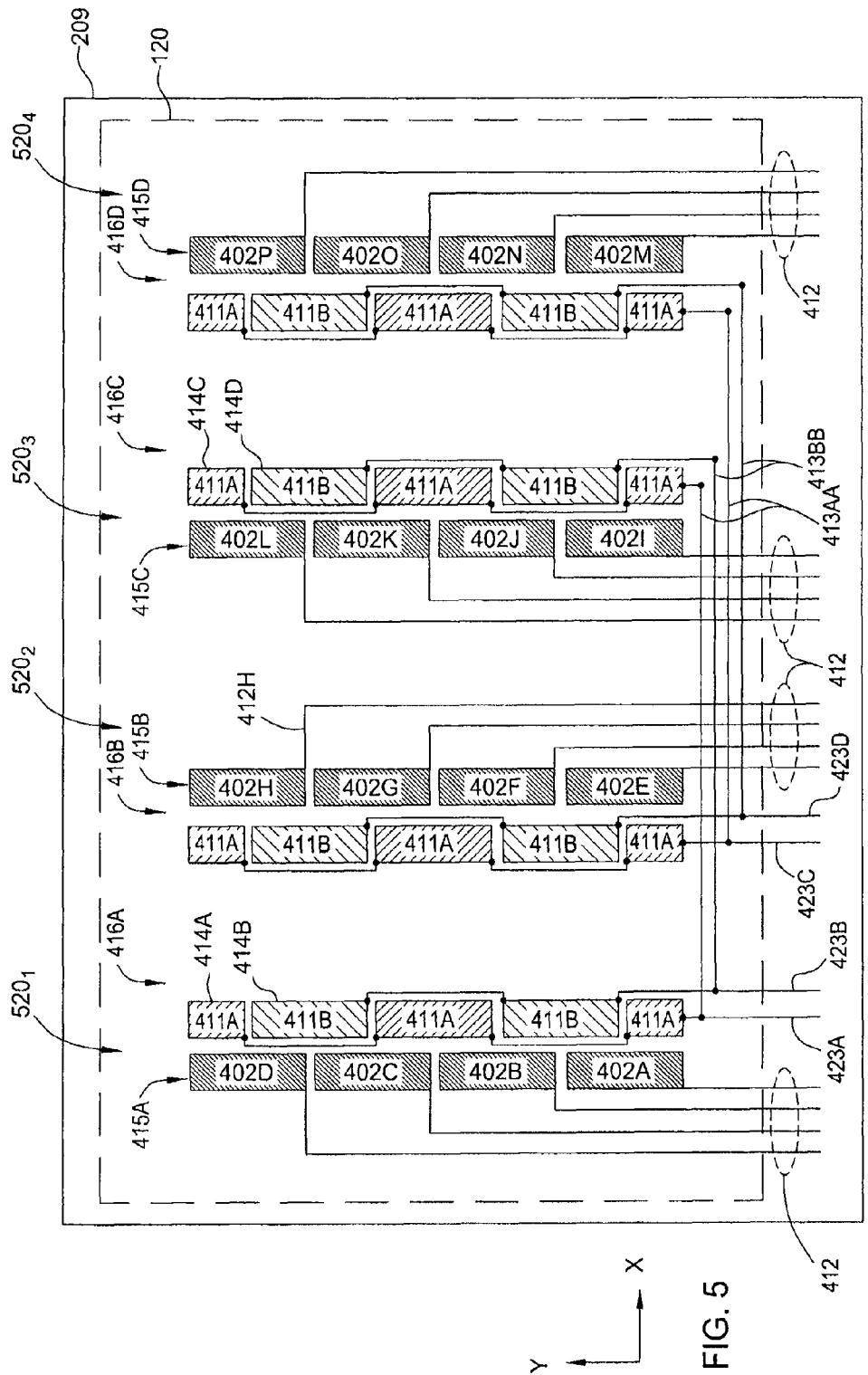
FIG. 5 is a schematic diagram illustrating four sets of sensor electrode arrays, which are disposed within a portion of a sensing region and each include arrays of sensor electrodes, according to one or more of the embodiments described herein.

In another configuration, as illustrated in FIG. 5, the arrays of receiver electrodes 416, and their associated traces 413A-413B, are positioned next to each other with no intervening array(s) of transmitter electrodes 415 positioned between them. The input device 100 illustrated in FIG. 5 generally includes four sets of sensor electrode arrays $520_1$-$520_4$ that each contain two or more arrays of sensor electrodes, such as a first array of transmitter electrodes 415A and a first array of receiver electrodes 416A. By positioning the arrays of receiver electrodes and their associated traces next to each other, the cross-coupling of the arrays of receiver electrodes and non-directly coupled electrode regions is minimized, and the problem of false or misleading input object position determination can be eliminated.

In some embodiments, one or more groups of sensor electrodes in an array of sensor electrodes that are positioned within a first set of sensor electrode arrays are coupled with one or more groups of sensor electrodes in an array of sensor electrodes that are positioned within a second set of sensor electrode arrays to help reduce the number of traces that are required to sense the position of an input object within the sensing region 120. In one example, as illustrated in FIG. 5, a first group of receiver electrodes 414A, which include electrode regions 411A, in the first array of receiver electrodes 416A in the first set of sensor electrode arrays $520_1$ are coupled to the first group of receiver electrodes 414C, which include electrode regions 411A, in the third array of receiver electrodes 416C in the third set of sensor electrode arrays $520_3$ using the trace 413AA. In general, the one or more groups of sensor electrodes in different sets of sensor electrode arrays can be connected together to reduce the number of traces and complexity of the processing system 110 components. In some embodiments, at least one electrode region in a first array of receiver electrodes is interconnected with at least one electrode region in a second array of receiver electrodes, which are disposed in the sensing region 120.

Referring to FIG. 5, the arrays of receiver electrodes 416A and 416B and arrays of receiver electrodes 416C and 416D, and their associated traces 413A-413B, are each positioned near to each other (e.g., adjacent to each other). In this configuration, the arrays of receiver electrodes 416 and associated traces are positioned next to each other and are disposed between two or more arrays of transmitter electrodes 415. Thus, when the sensor electrode region 402H is driven for capacitive sensing, the trace 412H is positioned so that it will essentially not capacitively couple to the first sensor electrode region 411A or the second sensor electrode region 411B in the second array of receiver electrodes $416_2$ or the first sensor electrode region 411A or the second sensor electrode region 411B in the first or third array of receiver electrodes $416_1$ or $416_3$.

Figure 6A:
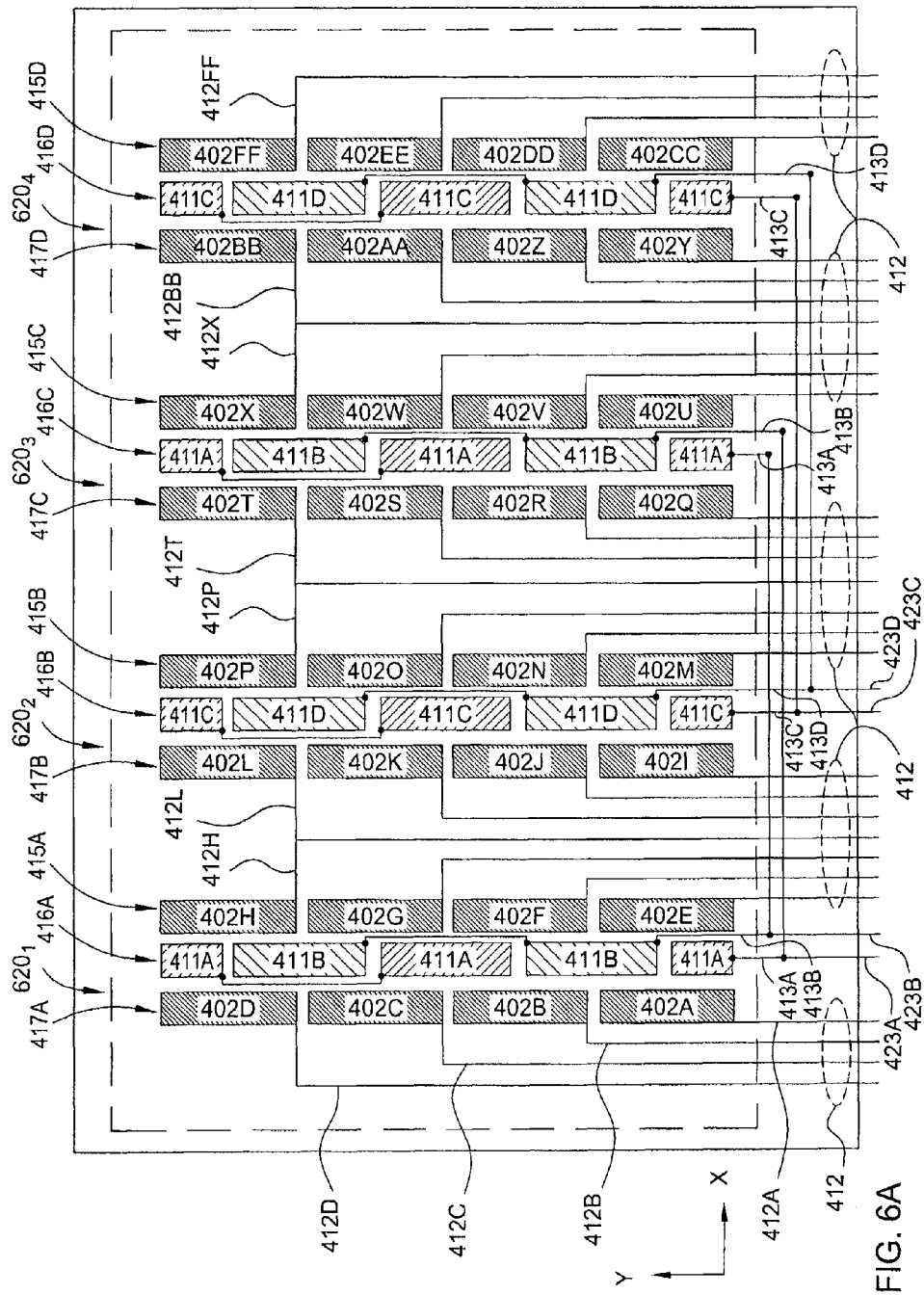
FIG. 6A is a schematic diagram illustrating four sets of sensor electrode arrays, which are disposed within a portion of a sensing region and each include arrays of sensor electrodes, according to one or more of the embodiments described herein.

In another configuration, as illustrated in FIG. 6A, each of the sets of sensor electrode arrays $620_1$-$620_4$ include an array of receiver electrodes 416, and their associated traces 413A-413B or 413C-413D, that are positioned between array(s) of transmitter electrodes 415. In one example, a first set of sensor electrode arrays $620_1$ includes three arrays of sensor electrodes, such as a first array of transmitter electrodes 415A, a first array of opposing transmitter electrodes 417A and a first array of receiver electrodes 416A. It is believed that positioning an array of one type of sensing electrode between at least two arrays of another type of sensing electrodes that form unique pixels, such as an array of receiving electrodes between two arrays of transmitter electrodes or vice versa, the physical orientation of the different types of sensor electrodes can help shield or minimize the cross-coupling of electrodes that are positioned a distance away from the set of electrode arrays, and thus prevent the mischaracterization of an input objects position when electrodes in two or more different sets of sensor electrode arrays are connected together. Also, in one example, as illustrated in FIG. 6B, by positioning an array of one type of sensing electrode between at least two arrays of another type of sensing electrodes will create a symmetric electric field between the electrodes when the center electrode is driven relative to the two outer electrodes or the two outer electrodes are driven relative to the inner electrode, which will improve the quality of the capacitive sensing signal and process.

Figure 6B:
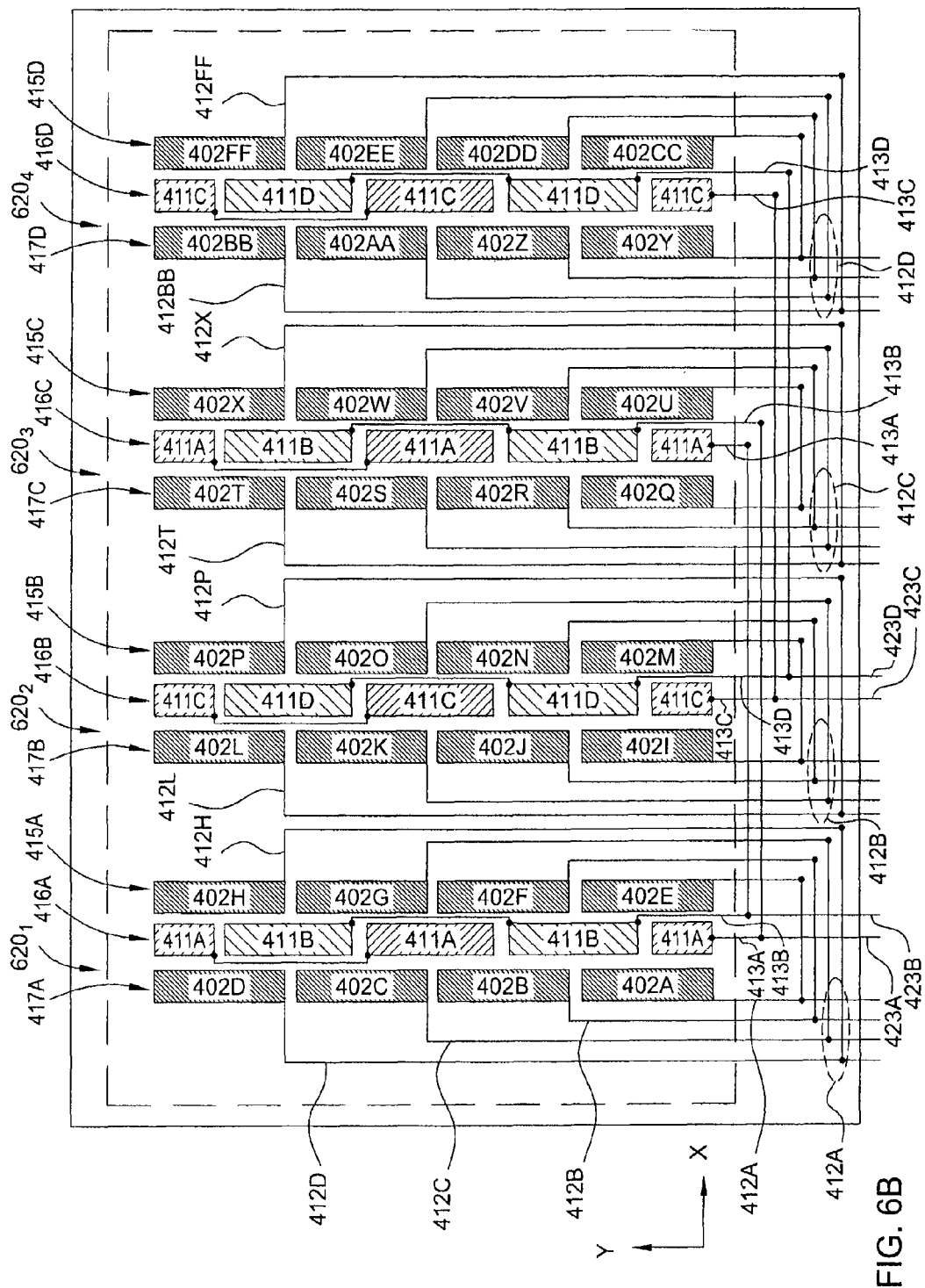
FIG. 6B is a schematic diagram illustrating four sets of sensor electrode arrays, which are disposed within a portion of a sensing region and each include arrays of sensor electrodes, according to one or more of the embodiments described herein.

FIG. 6B illustrates an example of an electrode connection configuration that is formed in each of the sets of sensor electrode arrays $620_1$-$620_4$ to create a symmetric electric field between pairs of opposing electrodes during operation of the input device. In this example, the electrodes 402 in the same row, such as electrodes 402D and 402H, electrodes 402L and 402P, electrodes 402C and 402G, etc. are each coupled together to form a symmetric electrode configuration relative to an opposing electrode 411. One will note that the number of traces 412 that need to be connected to the processing system components 110, in this example, are cut in half, due to the interconnection the electrodes 402 positioned in each row. In this configuration, only traces 412A-D need to be routed and connected to the processing system components, which is a smaller subset of the number of traces 412 shown in FIG. 6A. Also, if the electrodes 402 (e.g., electrodes 402D and 402H) are driven relative to the electrodes 411 (e.g., electrodes 411A and/or 411B), or vice versa, the electric fields created between each of the electrodes 402 and the centrally positioned electrode 411 will be symmetric. Thus, as noted above, the quality of the capacitive sensing signal can be improved and the cost and complexity of the input device can be reduced due to the reduction in the number of required traces and capacitive sensing channels.

As illustrated in FIGS. 6A and 6B, at least one electrode region in a first array of receiver electrodes in a first set of sensor electrode arrays is interconnected with at least one electrode region in a second array of receiver electrodes in a second set of sensor electrode arrays, which are all disposed in the sensing region 120. By positioning the arrays of receiver electrodes and their associated traces between two arrays of transmitter electrodes that are positioned to directly couple to the receiver electrodes in the array of receiving electrodes, the cross-coupling of the arrays of receiver electrodes and other non-directly coupled transmitter electrode regions is minimized. In one example, when the sensor electrode region 402L is driven for capacitive sensing, the trace 412L is positioned so that it will not capacitively couple to the first sensor electrode region 411A or the second sensor electrode region 411B in the first array of receiver electrodes 416A or the first sensor electrode region 411A or the second sensor electrode region 411B in the third array of receiver electrodes 416C.

In some embodiments of the invention, two or more traces are coupled together within the sensing region 120 to further reduce the number of connections that are required to make to the processing system 110 components. In one example, as illustrated in FIG. 6A, the traces 402H and 402L, 402P and 402T, and 402X and 402BB are each connected together to reduce the number of traces 412 that are required to connect the electrode regions to the processing system components. In this example, the total number of required traces 412 that are coupled to the processing components can be reduced by four traces.

Figure 7:
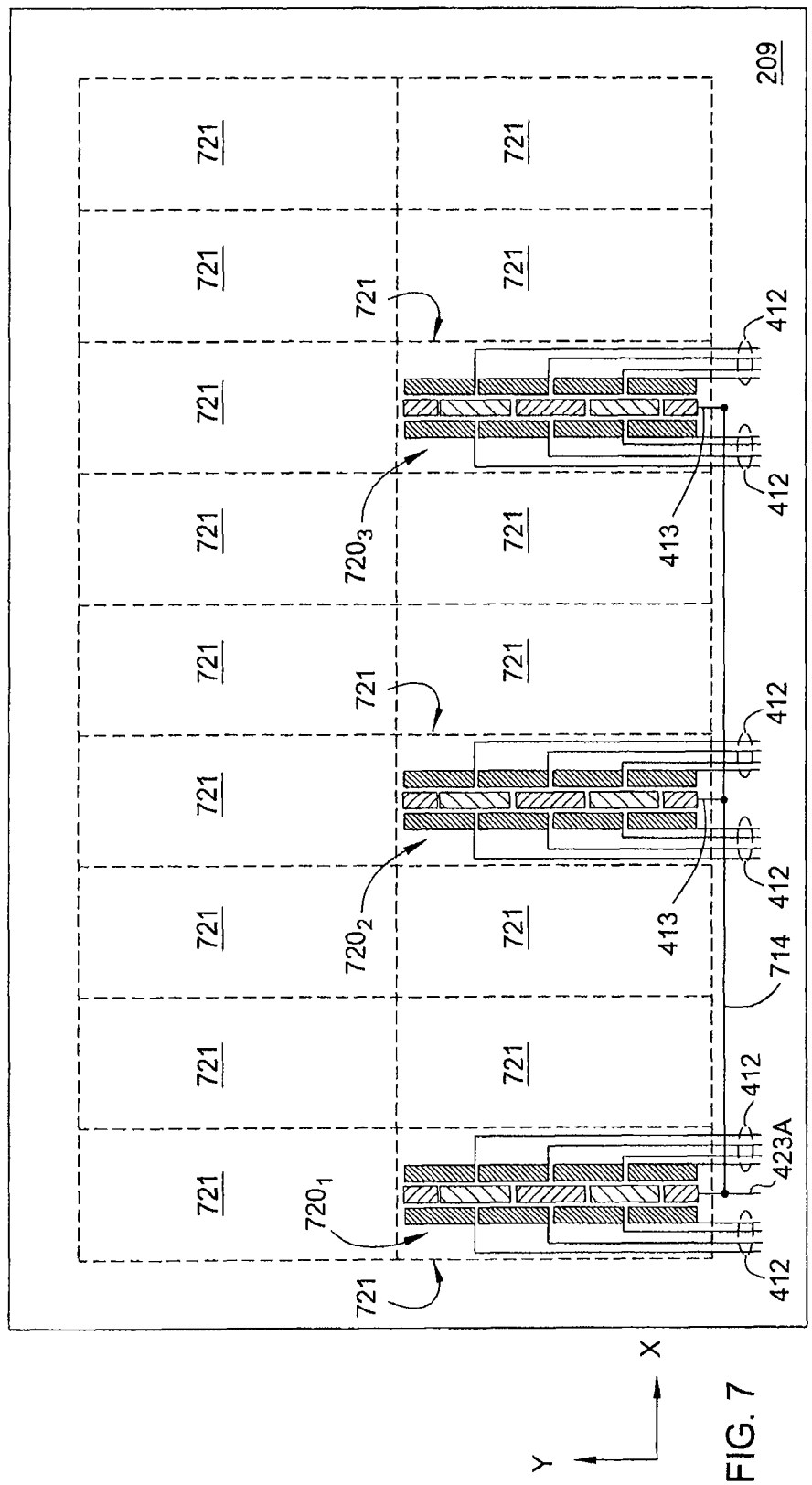
FIG. 7 is a schematic diagram illustrating sets of sensor electrode arrays that are interconnected, and are disposed within sectors of the sensing region of an input device, according to one or more of the embodiments described herein.
Figure 8:
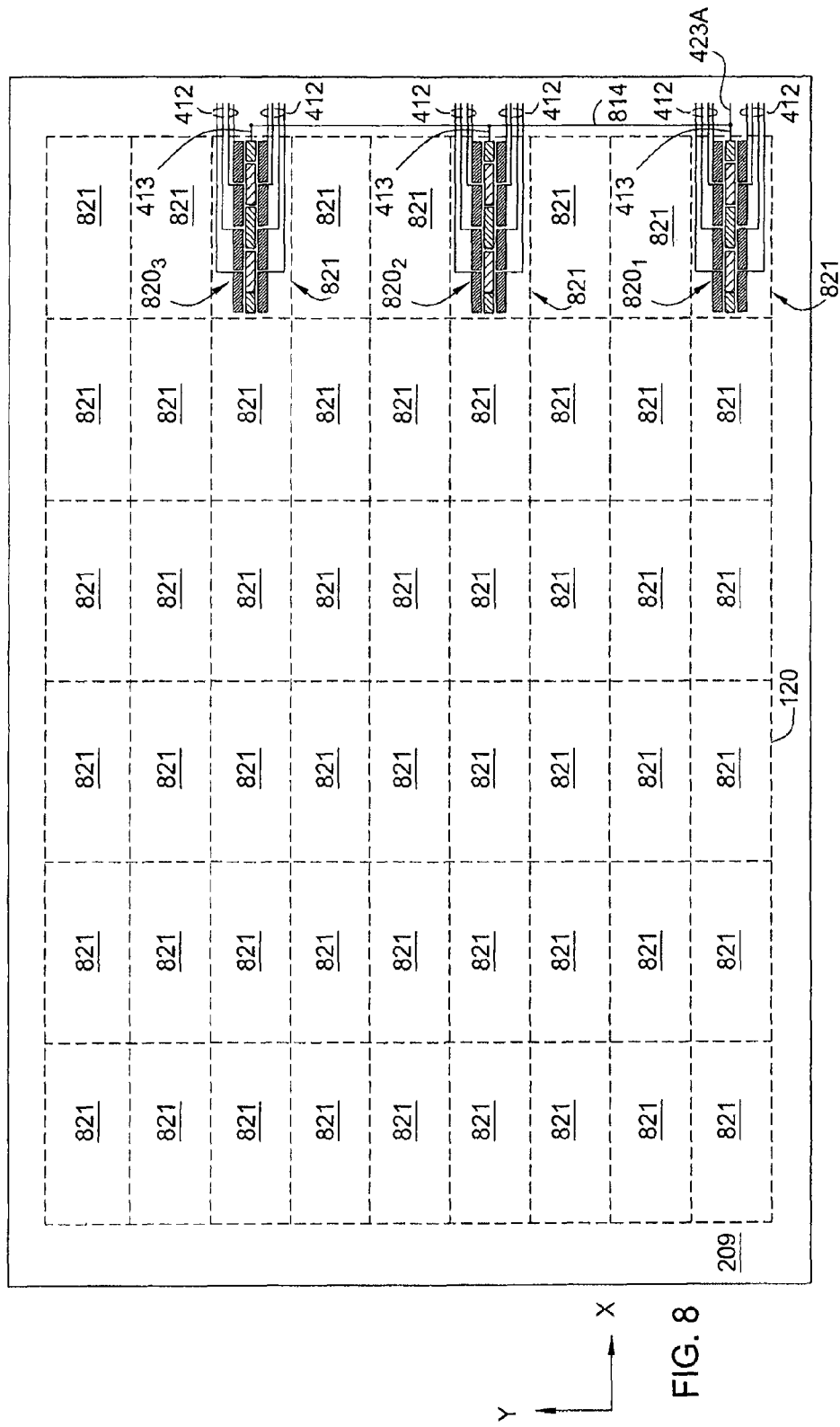
FIG. 8 is a schematic diagram illustrating sets of sensor electrode arrays that are interconnected, and are disposed within sectors of the sensing region of an input device, according to one or more of the embodiments described herein.

FIGS. 7 and 8 illustrate a sensing region 120 of an input device 100 that is divided up into sectors 721 or 821 that are each configured to contain at least one set of sensor electrode arrays. For clarity of discussion, only three of the sectors 721 in FIG. 7 and three of the sectors 821 in FIG. 8 have a set of sensor electrode arrays shown therein. However, one skilled in the art will appreciate that each of the sectors 721 shown in FIGS. 7 and 8 could have at least one set of sensor electrode arrays disposed therein. Moreover, at least one electrode in each of these sets of sensor electrode arrays could be coupled with one or more electrodes in another set of sensor electrode arrays disposed in the same sector or other sectors within the sensing region 120. These electrode configurations will also generally include multiple arrays of capacitive pixels that each includes unique pairs of sensor electrodes.

As illustrated in FIG. 7, three sets of sensor electrode arrays $720_1$-$720_3$, which are positioned three sectors 721 away from each other, are coupled together to reduce the total number of traces (e.g., traces 412 and 413) that need to be connected to the processing system components (not shown). In this example, at least one electrode in each of the horizontally oriented three sets of sensor electrode arrays are coupled together using an interconnect 714 that is coupled to the traces 413 (e.g, trace 413A in FIG. 6A) in each set of sensor electrode arrays to reduce the number of traces (e.g., traces 412 and/or 423) that are required to connect each of the sensor electrode regions to the processing system components.

As illustrated in FIG. 8, three sets of sensor electrode arrays $820_1$-$820_3$, which are positioned three sectors 821 away from each other, are coupled together to reduce the total number of traces that need to be connected to the processing system components (not shown). In this example, at least one electrode in each of the three vertically oriented sets of sensor electrode arrays are coupled together using an interconnect 814 that is coupled to the traces 413 (e.g., trace 413A in FIG. 6A) in each set of sensor electrode arrays to reduce the number of traces (e.g., traces 412 and/or 423) that are required to connect each of the sensor electrode regions to the processing system components.

In one embodiment, one or more novel sensor electrode array configurations are used to reduce or minimize the number of traces and/or sensor electrodes required to sense the positional information of an input object within the sensing region of the input device.

The embodiments and examples set forth herein were presented in order to best explain the present technology and its particular application and to thereby enable those skilled in the art to make and use the present technology. Those skilled in the art will recognize that the foregoing description and examples have been presented for the purposes of illustration and example only. The description as set forth is not intended to be exhaustive or to limit the present technology to the precise form disclosed. While the foregoing is directed to embodiments of the present invention, other and further embodiments of the invention may be devised without departing from the basic scope thereof, and the scope thereof is determined by the claims that follow.

The invention claimed is:

1. A capacitive image sensor, comprising:
    a first array of sensor electrodes including electrodes of a first and second type, the first array of sensor electrodes disposed on a surface of a substrate, the first type of sensor electrodes in the first array aligned in substantially a first direction on the surface and the second type of sensor electrodes in the first array aligned in substantially the first direction, wherein each electrode of the first type in the first array is positioned to capacitively couple to one of the sensor electrodes of the second type in the first array;
    a second array of sensor electrodes including electrodes of the first and second type, the second array of sensor electrodes disposed on the surface of the substrate, the first type of sensor electrodes in the second array aligned in substantially the first direction and the second type of sensor electrodes in the second array aligned in substantially the first direction, wherein each of the electrodes of the first type in the second array is positioned to capacitively couple to one or more of the sensor electrodes of the second type in the second array; and
    wherein the second array of sensor electrodes is positioned a distance in a second direction from the first array of first sensor electrodes, and the second direction is not parallel to the first direction, and
    wherein at least one of the sensor electrodes of the second type in the first array is electrically coupled to at least one of the sensor electrodes of the second type in the second array.

2. The capacitive imaging sensor of claim 1, wherein the first type of sensor electrodes in the second array is a mirror image of the first type of sensor electrodes in the first array about a first axis of symmetry that is parallel to the first direction.

3. The capacitive imaging sensor of claim 1, further comprising:
    a third array of sensor electrodes including electrodes of the first type disposed on the surface of the substrate, wherein the first type of sensor electrodes in the third array are aligned in substantially the first direction, and each of the electrodes of the first type in the third array are positioned to capacitively couple to at least a portion of a sensor electrode of the second type in the first array of sensor electrodes; and a fourth array of sensor electrodes including electrodes of the first type disposed on the surface of the substrate, wherein each of the electrodes of the first type in the fourth array are aligned in substantially the first direction, and each of the electrodes of the first type in the fourth array is positioned to capacitively couple to at least a portion of an electrode of the second type in the second array of sensor electrodes.

4. The capacitive imaging sensor of claim 1, wherein the second type of sensor electrodes are configured as receiver electrodes and the first type of sensor electrodes are configured as transmitter electrodes, and none of the first type of sensor electrodes in the first array are ohmically coupled to an electrode of the first type in the second array of electrodes.

5. The capacitive imaging sensor of claim 1, wherein the sensor electrodes of the first type of the first and second arrays are disposed on the surface of the substrate between the sensor electrodes of the second type of the first array and the sensor electrodes of the second type of the second array.

6. The capacitive imaging sensor of claim 1, wherein the first array of the second type of sensor electrodes further comprises:
 a first group of second electrode regions comprising two or more second electrode regions; and
 a second group of second electrode regions comprising two or more second electrode regions,
 wherein each of the two or more second electrode regions in the first group are in electrical communication with each other and each of the two or more second electrode regions in the second group are in electrical communication with each other.

7. The capacitive imaging sensor of claim 1, wherein the first type of sensor electrodes and the second type of sensor electrodes are either transmitter electrodes or receiver electrodes, and the ratio of transmitter electrodes to receiver electrodes is greater than 1.

8. The capacitive imaging sensor of claim 1, wherein each of the first type of sensor electrodes further comprise a trace and each of the second type of sensor electrodes further comprise a trace, and wherein the traces are coupled to a sensor processor.

9. The capacitive imaging sensor of claim 1, wherein the first type of sensor electrodes and the second type of sensor electrodes are substantially transparent.

10. The capacitive imaging sensor of claim 1, wherein the substrate comprises part of a display.

* * * * *